United States Patent
Park et al.

(10) Patent No.: US 10,280,080 B2
(45) Date of Patent: May 7, 2019

(54) METHANE STEAM REFORMING, USING NICKEL/ALUMINA NANOCOMPOSITE CATALYST OR NICKEL/SILICA-ALUMINA HYBRID NANOCOMPOSITE CATALYST

(71) Applicant: Korea Institute of Energy Research, Daejeon (KR)

(72) Inventors: Ji Chan Park, Daejeon (KR); Jung Il Yang, Daejeon (KR); Heon Jung, Daejeon (KR); Tak Hyoung Lim, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 15 days.

(21) Appl. No.: 15/156,741

(22) Filed: May 17, 2016

(65) Prior Publication Data

US 2017/0001863 A1    Jan. 5, 2017

(30) Foreign Application Priority Data

Jun. 30, 2015 (KR) .......................... 10-2015-0093758

(51) Int. Cl.
*C01B 3/40* (2006.01)
*B01J 23/755* (2006.01)
(Continued)

(52) U.S. Cl.
CPC ............... *C01B 3/40* (2013.01); *B01J 23/755* (2013.01); *B01J 33/00* (2013.01); *B01J 35/002* (2013.01);
(Continued)

(58) Field of Classification Search
CPC ........................................................ B01J 21/12
See application file for complete search history.

(56) References Cited

U.S. PATENT DOCUMENTS 5,064,524 A * 11/1991 Forester ................. C10G 11/18
                                                              208/113
6,312,658 B1 * 11/2001 Hufton ................... B01D 53/02
                                                              423/418.2
(Continued)

FOREIGN PATENT DOCUMENTS

JP        2002126531 A     5/2002
JP        2002-172326 A    6/2002
(Continued)

OTHER PUBLICATIONS

Yolk-Satellite-Shell Structured Ni-Yolk@Ni@SiO2 Nanocomposite: Superb Catalyst toward Methane CO2 reforming Reaction Ziwei Li et al. ACS Catalysis, V. 4, pp. 1526-1536 (Year: 2014).*

(Continued)

*Primary Examiner* — Douglas B Call
(74) *Attorney, Agent, or Firm* — Osha Liang LLP

(57) ABSTRACT

The present invention relates to a method of methane steam reforming using a nickel/alumina nanocomposite catalyst. More specifically, the present invention relates to a method of carrying out methane steam reforming using a nickel/alumina nanocomposite catalyst wherein nickel metal nanoparticles are uniformly loaded in a high amount on a support via a melt infiltration method with an excellent methane conversion even under a relatively severe reaction condition of a high gas hourly space velocity or low steam supply, and to a catalyst for this method. In addition, the present invention prepares a nickel/silica-alumina hybrid nanocatalyst by mixing the catalyst prepared by the melt infiltration method as the first catalyst and the nickel silica yolk-shell catalyst as the second catalyst, and applies it to the steam reforming of methane to provide a still more excellent catalytic activity even under the higher temperature of 700° C. or more with the excellent methane conversion.

18 Claims, 12 Drawing Sheets

(51) Int. Cl.
*B01J 21/12* (2006.01)
*B01J 21/08* (2006.01)
*B01J 37/16* (2006.01)
*B01J 35/00* (2006.01)
*B01J 35/02* (2006.01)
*B01J 37/00* (2006.01)
*B01J 37/02* (2006.01)
*C01B 3/38* (2006.01)
*B01J 21/04* (2006.01)
*B01J 37/03* (2006.01)
*B01J 37/06* (2006.01)
*B01J 37/08* (2006.01)
*B01J 37/18* (2006.01)
*B01J 33/00* (2006.01)

(52) U.S. Cl.
CPC ......... *B01J 35/0006* (2013.01); *B01J 35/006* (2013.01); *B01J 35/008* (2013.01); *B01J 35/0013* (2013.01); *B01J 35/0086* (2013.01); *B01J 37/0036* (2013.01); *B01J 37/0072* (2013.01); *B01J 37/0081* (2013.01); *B01J 37/031* (2013.01); *B01J 37/06* (2013.01); *B01J 37/08* (2013.01); *B01J 37/16* (2013.01); *B01J 37/18* (2013.01); *C01B 3/382* (2013.01); *B01J 21/04* (2013.01); *C01B 2203/0233* (2013.01); *C01B 2203/1058* (2013.01); *C01B 2203/1082* (2013.01); *C01B 2203/1241* (2013.01); *C01B 2203/142* (2013.01)

(56) References Cited

U.S. PATENT DOCUMENTS

2004/0014600 A1* 1/2004 Fukunaga ............. B01J 23/894
502/304

2014/0315711 A1* 10/2014 Kumar ................... B01J 37/031
502/303
2016/0121305 A1* 5/2016 Kartick .................... B01J 35/10
252/373

FOREIGN PATENT DOCUMENTS

KR 10-2012-0122544 A 11/2012
KR 10-2014-0110660 A 9/2014
WO WO2014/195904 * 12/2014

OTHER PUBLICATIONS

Recent Developments in the Synthesis of Supported Catalysts Peter Munnik et al. Chem. Rev. V. 115, pp. 6687-6718 (Year: 2015).*
Fundamentals of Melt Infiltration for the Preparation of Supported Metal Catalysts. The case of Co/SiO2 for Fischer-Tropsch Synthesis Tamara M. Eggenhuisen et al. J. Am. Chem. Soc. V. 132, pp. 18318-18325 (Year: 2010).*
Passivation of a Co—Ru-gamma alumina Fischer-Tropsch Catalyst Sonia Hammache et al. catalysis Today, V. 71, pp. 361-367 (Year: 2002).*
Decision to Grant dated Jun. 14, 2016, issued by the Korean International Patent Office (KIPO) in related Korean Patent Application No. 10-2015-0093758 (3 pages).
Park, Ji Chan et al. "Ni@SiO2 yolk-shell nanoreactor catalysts: High temperature stability and recyclability," Journal of Materials Chemistry, vol. 20, p. 1239-1246, Nov. 2009 (9 pages).
Jun, Zhu et al. "Dispersion of nano-nickel into γ-Al2O3 studied by positron," Radiation Physics and Chemistry, vol. 68, p. 541-544, Apr. 2003 (4 pages).

* cited by examiner

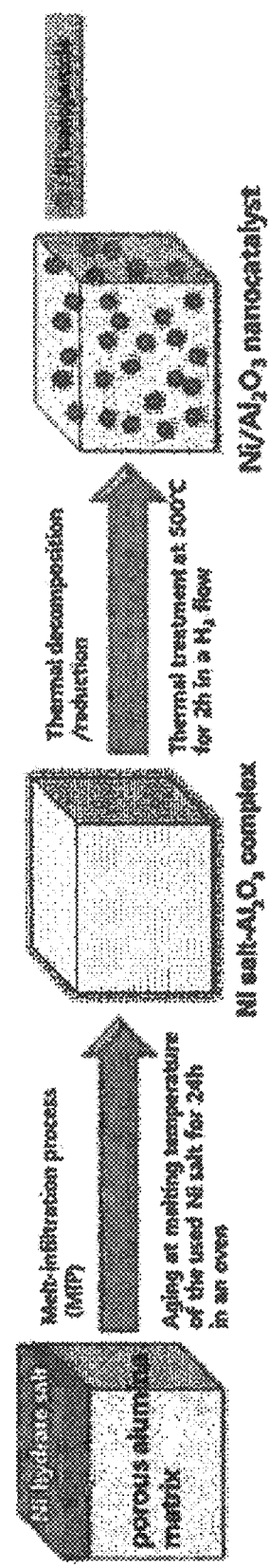
[FIGURE 1]

[Figure 2]
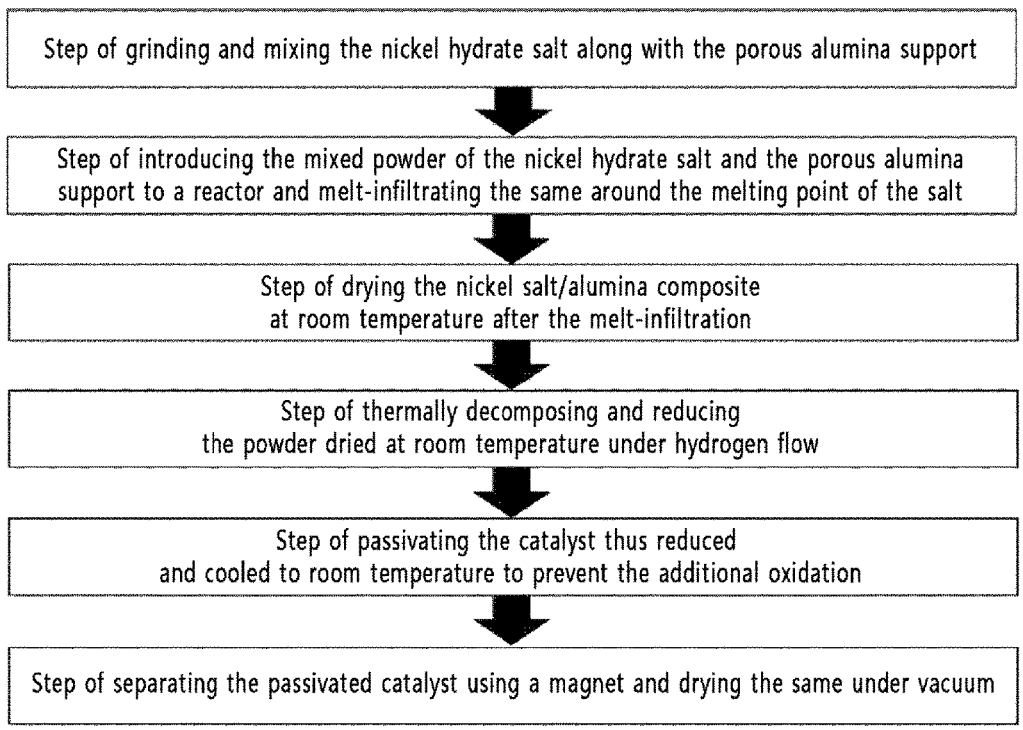

[Figure 3]
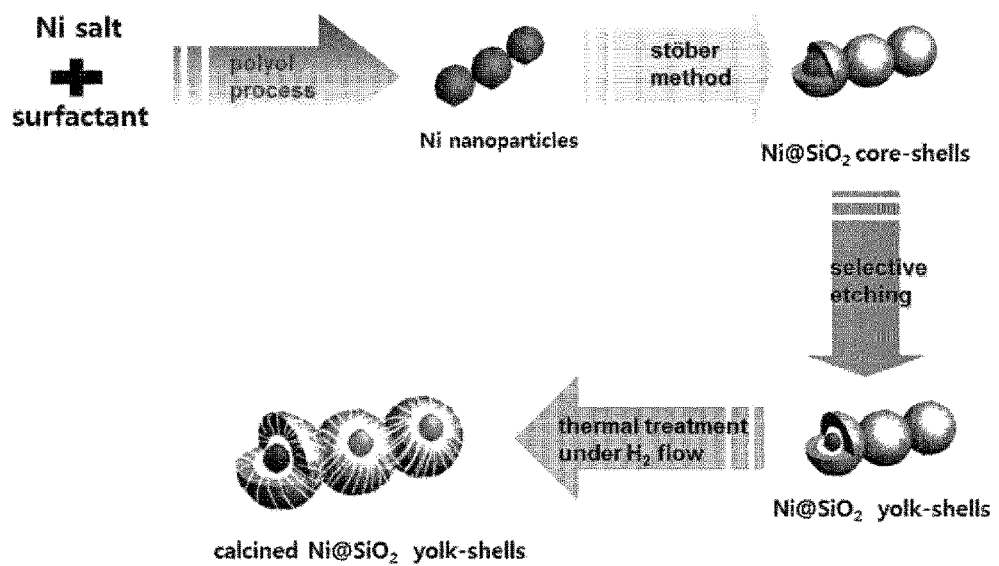

[Figure 4]
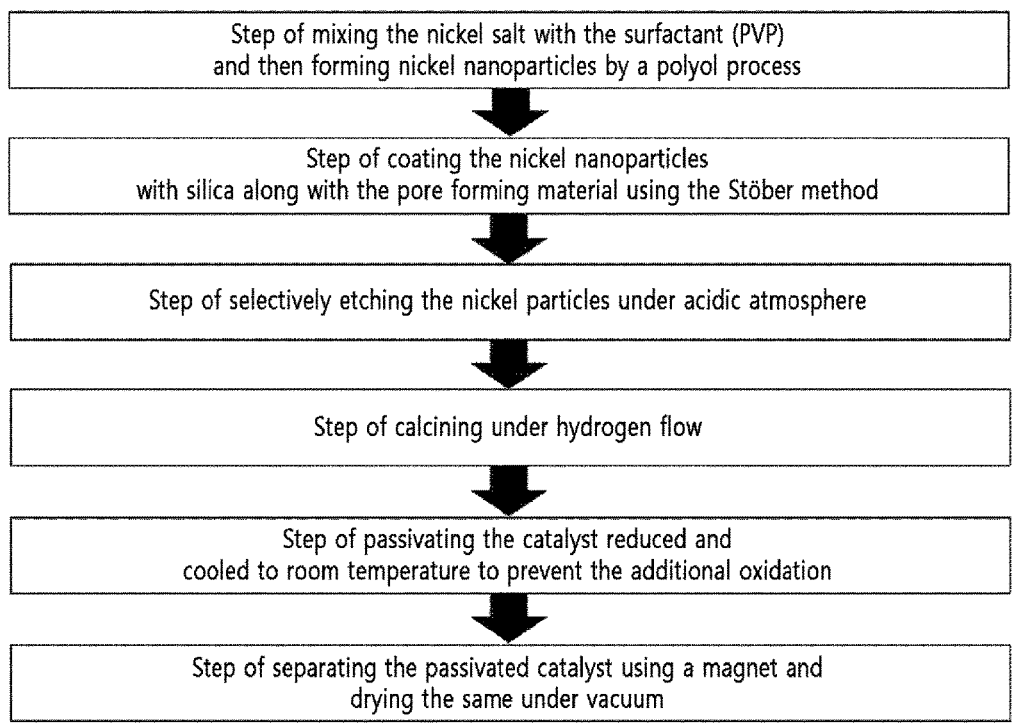

[Figure 5]
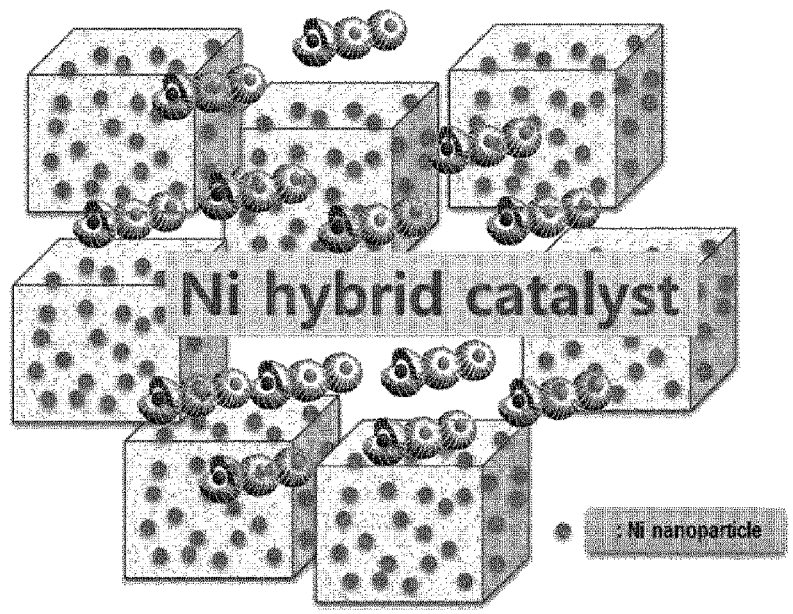
[Figure 6]
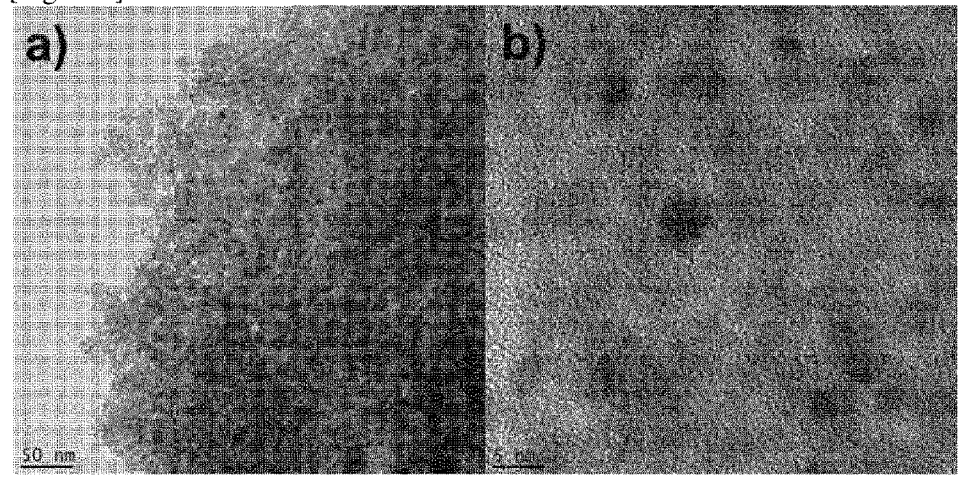

[Figure 7]
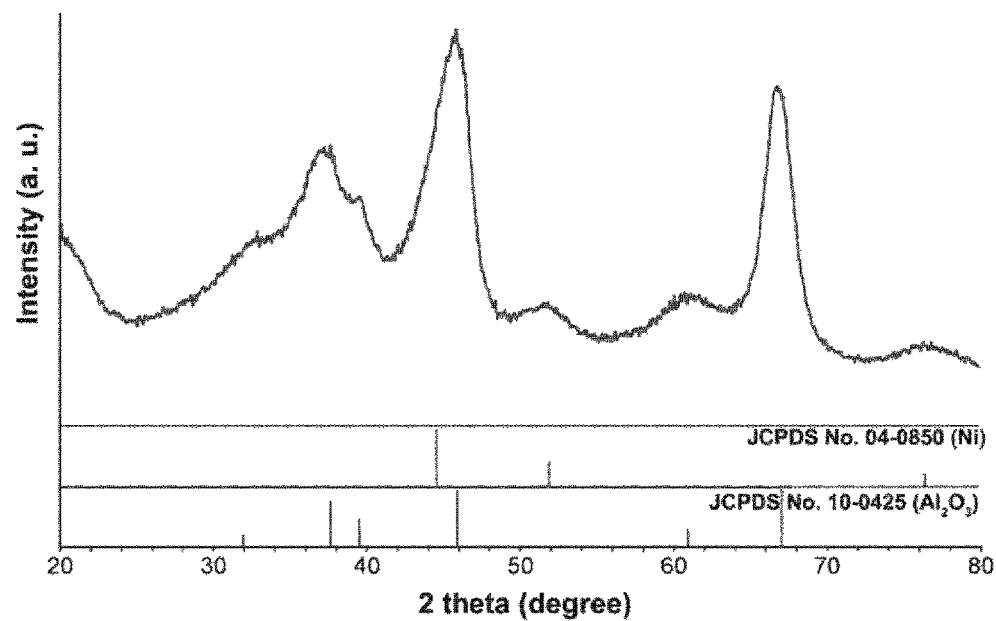
[Figure 8]
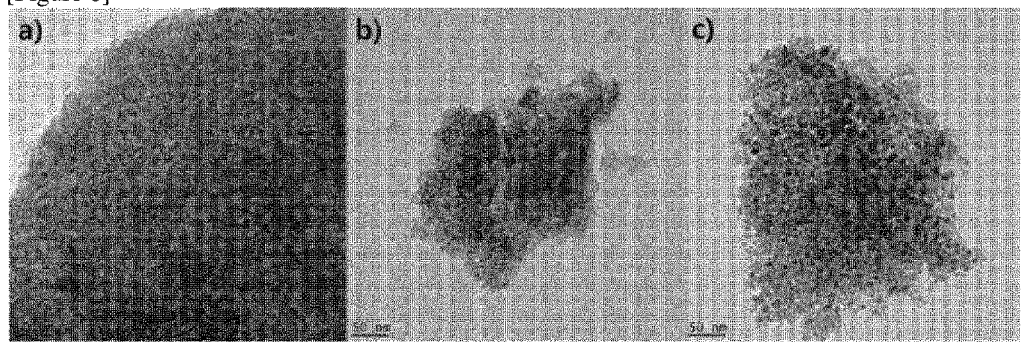

[Figure 9]
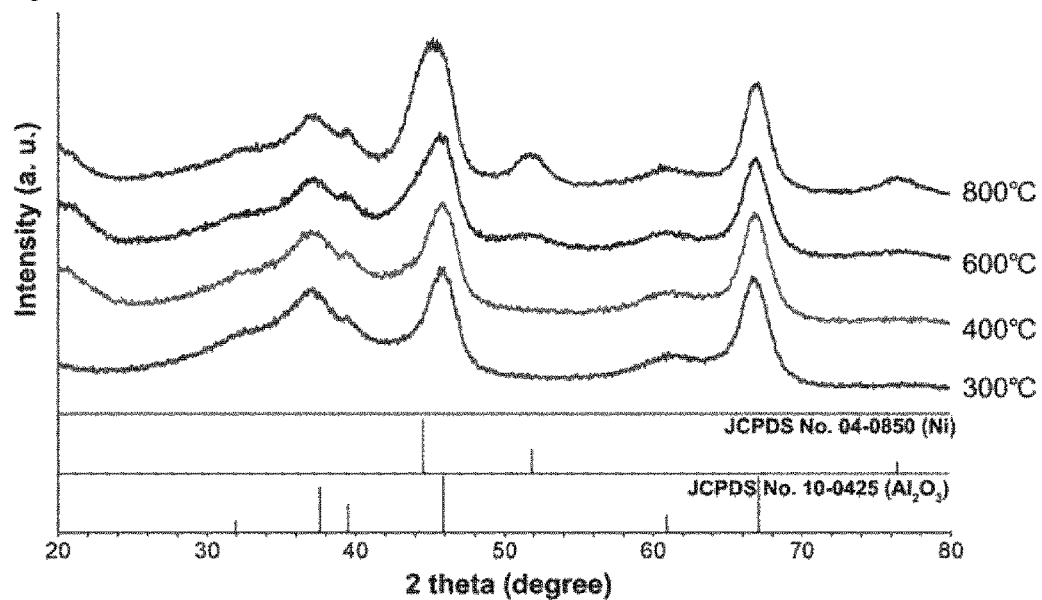

[Figure 10]
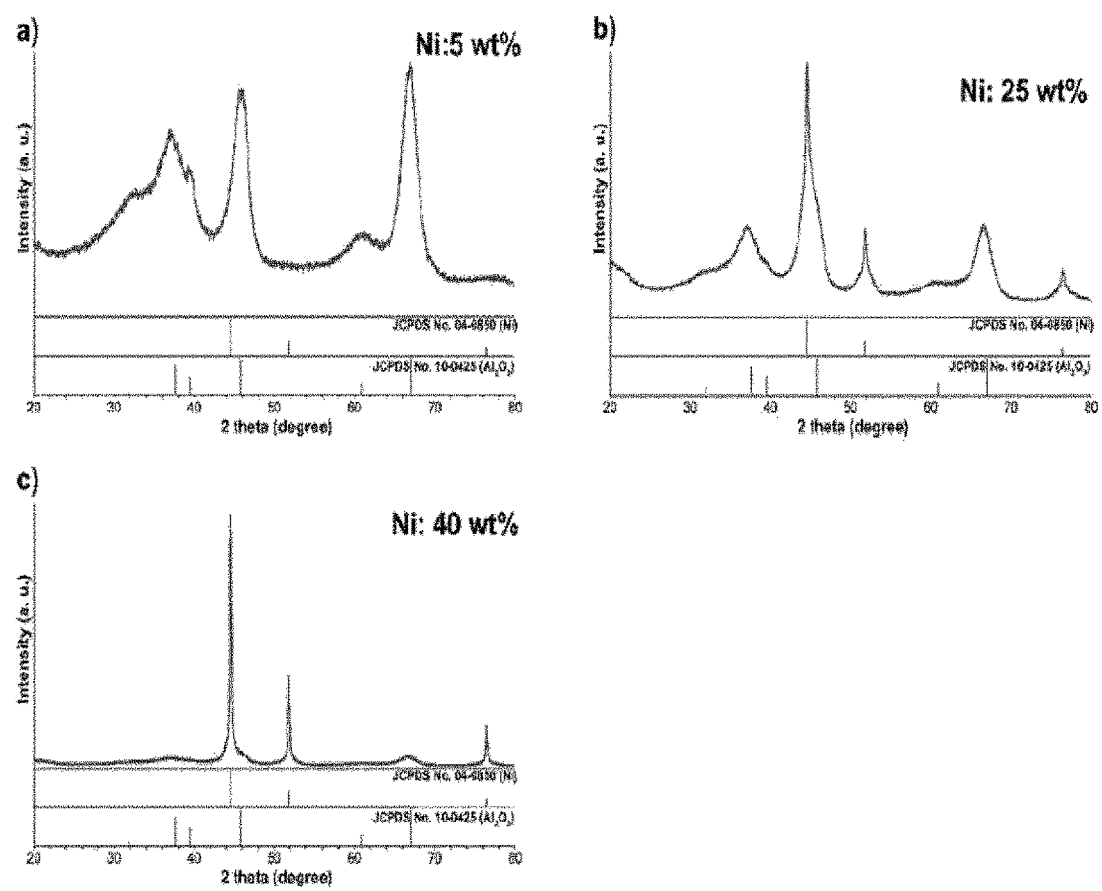

[Figure 11]
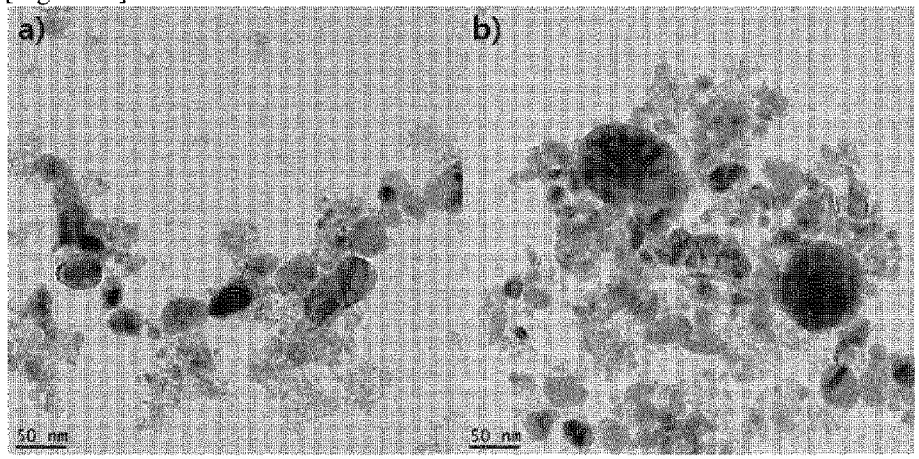
[Figure 12]
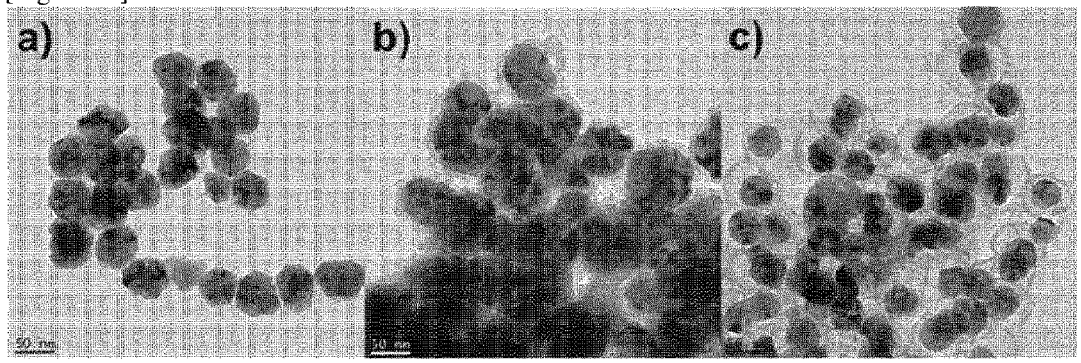

[Figure 13]
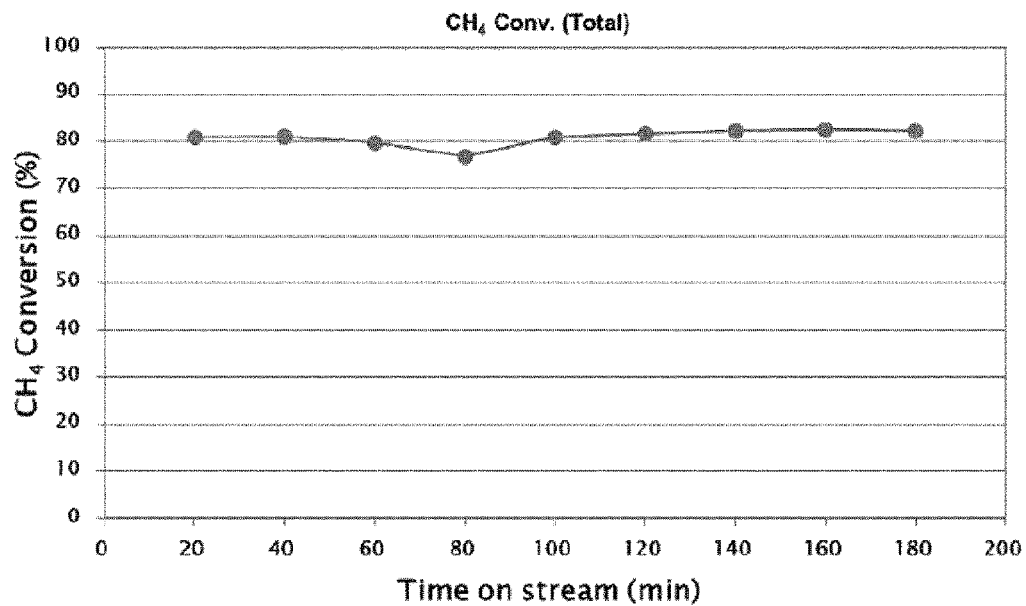
[Figure 14]
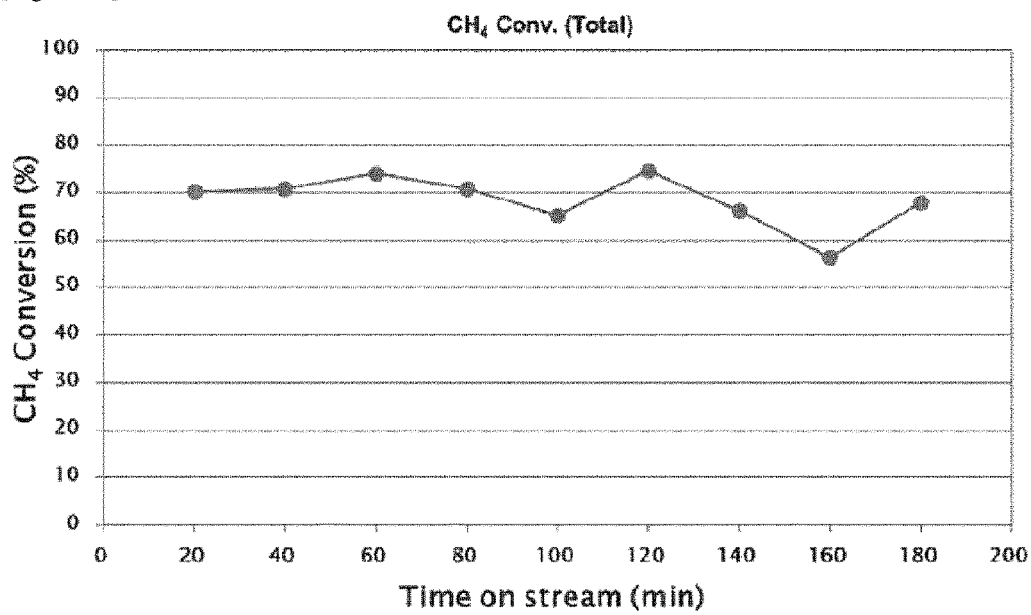

[Figure 15]
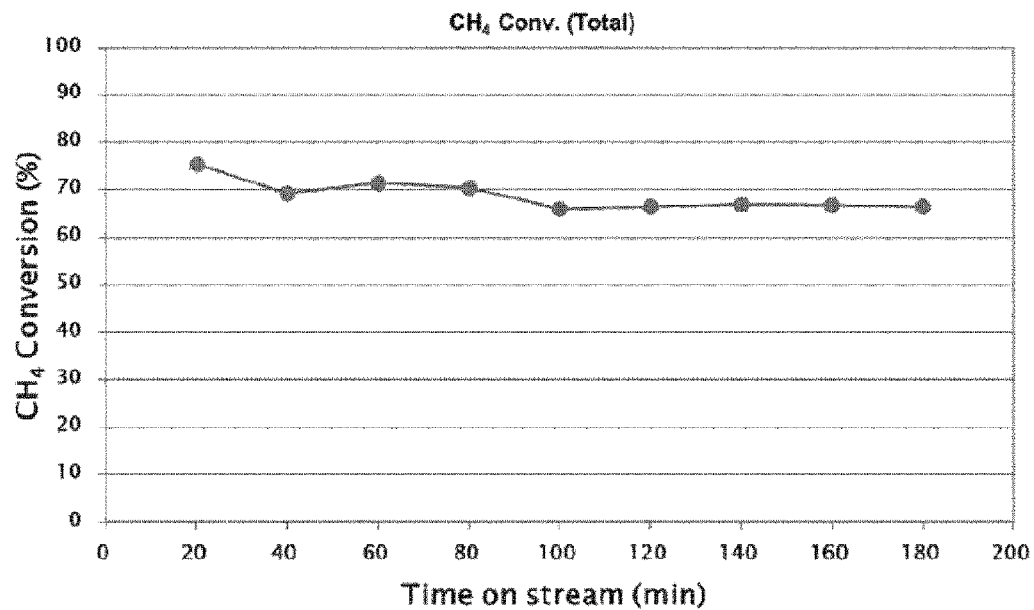
[Figure 16]
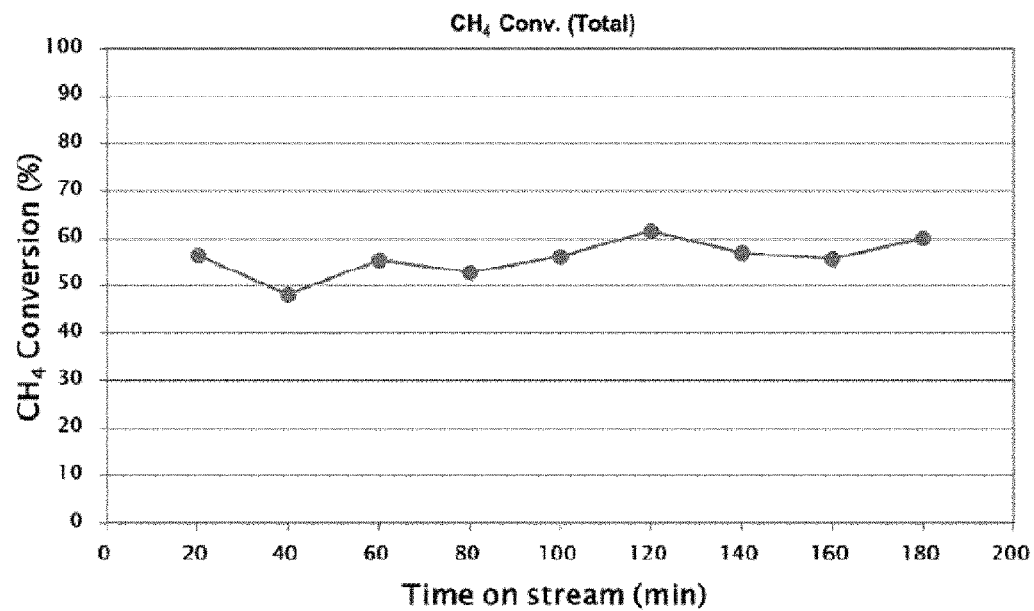

[Figure 17]
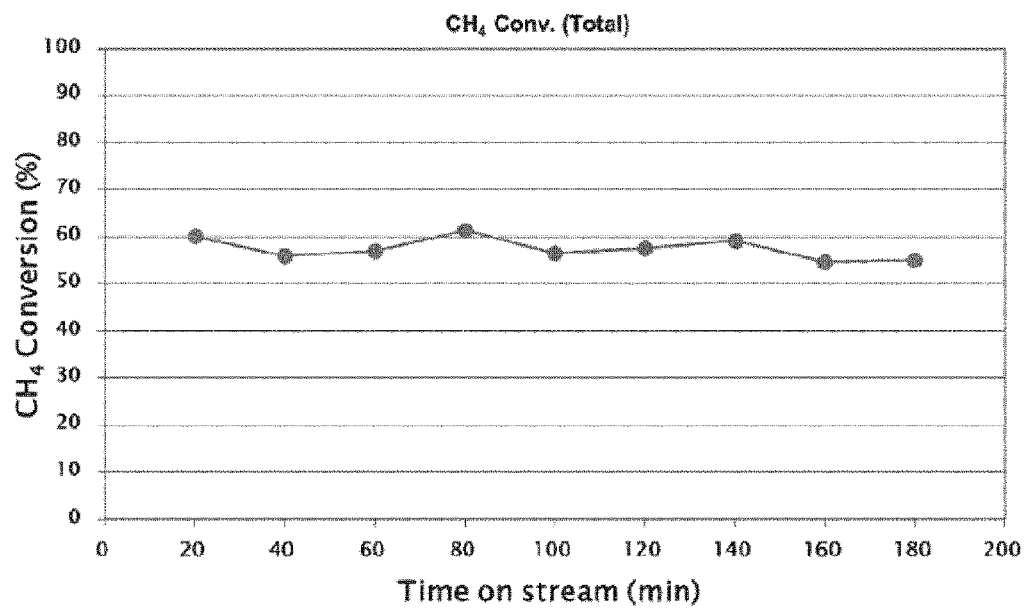
[Figure 18]
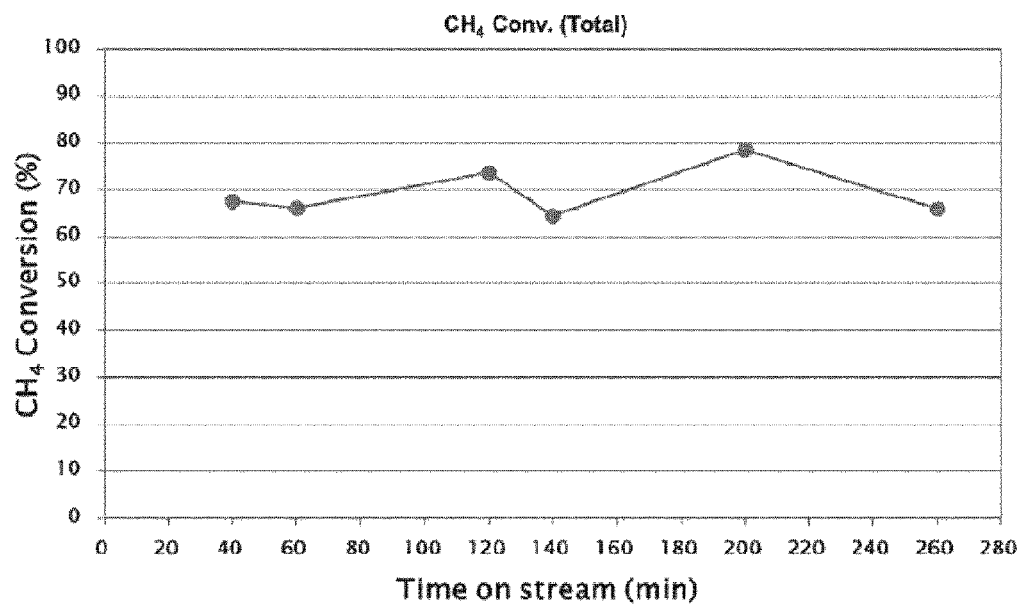

METHANE STEAM REFORMING, USING NICKEL/ALUMINA NANOCOMPOSITE CATALYST OR NICKEL/SILICA-ALUMINA HYBRID NANOCOMPOSITE CATALYST

BACKGROUND OF THE INVENTION (a) Field of the Invention

The present invention relates to a method of methane steam reforming, using a nickel/alumina nanocomposite catalyst or a nickel/silica-alumina hybrid nanocomposite catalyst. More specifically, the present invention relates to a method of carrying out methane steam reforming using a nickel/alumina nanocomposite catalyst or a nickel/silica-alumina hybrid nanocomposite catalyst with an excellent methane conversion even under relatively severe reaction conditions of a high gas hourly space velocity or low steam supply.

(b) Description of the Related Art

Natural gas among the fuels usable as an alternative energy has the feature that its deposit is rich as well as it does not generate any side product. The natural gas whose main component is methane can be a good hydrogen source since the hydrogen to carbon ratio therein is higher than other fossil fuels. Based on this aspect, various techniques of producing hydrogen from methane have been developed, and typical techniques thereof include steam reforming of methane (SRM), autothermal reforming (ATR), partial oxidation, pyrolysis, etc.

Among the above, the steam reforming of methane is a strongly endothermic reaction wherein methane and steam are reacted to produce carbon monoxide and hydrogen.

The commercially available nickel-based catalysts used in such a steam reforming of methane have the demerits that they show a low activity since the size of active particles is not uniform and relatively large, they are vulnerable to sintering particularly when they are reacted at a high temperature, and also they show a significantly low durability due to the inactivation of catalyst progressed by the carbon deposition. In order to prevent such inactivation of catalyst due to the carbon deposition, excess steam is added to the methane steam reforming. In this case, the larger calorie is needed for the steam supply as the molar ratio of steam is higher, which ultimately lowers the energy efficiency during the reaction. In addition, the existing commercially available nickel-based catalysts have the disadvantage of low activity when they are applied to the steam reforming of methane at a high gas hourly space velocity.

The previous studies have been developed hitherto to overcome the above problems. For example, Korean Patent Laid-open Publication No. 10-2012-0122544 discloses a technique of improving the activity and life expectancy of a catalyst by providing an aqueous mixed solution containing a porous carrier, an alkali metal precursor, an alkaline earth metal precursor, and a titanium oxide, drying and calcining the aqueous solution to prepare a modified nickel catalyst wherein a nickel catalyst is combined with a composite consisting of an alkali metal or an alkaline earth metal and a titanium oxide, thereby enhancing the resistance against the inactivation of a nickel catalyst shown in the steam reforming of methane. Korean Patent Laid-open Publication No. 10-2014-0110660 discloses a technique of inhibiting the inactivation of a catalyst by adding an alumina support to a solvent wherein an organic acid is dissolved, impregnating and drying it to prepare the organic acid-treated alumina support, adding thus prepared alumina support to a solvent wherein a nickel precursor is dissolved, impregnating and drying it to prepare a core-shell structured nickel-alumina catalyst, on the surface of which is nickel uniformly distributed, thereby providing an excellent reactivity even under the condition of high gas hourly space velocity and inhibiting the sintering phenomena of nickel, which occurs inside the locally heated catalyst.

However, the previous techniques still show the problem of low methane conversion due to the low catalytic activity when the gas hourly space velocity is very high or the molar ratio of steam/methane ($H_2O/CH_4$) is low.

Furthermore, the nickel-based supported catalysts used in the previous methane steam reforming have been prepared via an incipient wetness impregnation method. However, the previous incipient wetness impregnation method requires a process of selecting a suitable solvent depending on the type of nickel metal salt used as the nickel precursor to obtain a catalyst wherein the nickel active particles are uniformed supported, and it also requires a process of repeating impregnation and drying at a high temperature to support the nickel active particles with a high loading amount. Such a process of using a solvent has the burden of risk at working, environmental pollution, treatment by excess solvent during the mass production of catalyst.

Also, it is needed to control the nickel metal particles to have a uniform and small size of 10 nm or less for the methane steam reforming.

Thus, there is a need for the development of a method of carrying out methane steam reforming with an excellent methane conversion even under relatively severe reaction conditions of a high gas hourly space velocity or low steam supply. It is also needed to develop a supported catalyst which can be prepared by a simple synthetic procedure and wherein the nickel active particles have a small size of 10 nm or less and are uniformly distributed with a high loading amount.

On the other hand, recently, a highly loaded with nickel, highly dispersed, and highly active nickel-silica yolk-shell catalyst that is very stable at a high temperature and shows a very high load of nickel in the level of 80-90 wt % has been developed. However, its use is limited due to such disadvantages as high manufacturing cost and difficulty in mass production.

SUMMARY OF THE INVENTION

The object of the present invention is to provide a catalyst that is able to carry out methane steam reforming at a high temperature with an excellent methane conversion even under relatively severe reaction conditions of a high gas hourly space velocity or low steam supply, wherein nickel metal nanoparticles are uniformly loaded in a high amount on a support via a melt infiltration method.

Also, it is another object of the present invention to provide a method of carrying out methane steam reforming with an excellent methane conversion at a high temperature using a nickel/alumina nanocomposite catalyst, or a nickel/silica-alumina hybrid nanocomposite catalyst obtained by mixing the above catalyst with a yolk-shell shaped nickel/silica catalyst.

A first aspect of the present invention provides a method of methane steam reforming with a methane conversion of 50% or more, which comprises i) a step of providing a first catalyst for methane steam reforming which is prepared by a first step of grinding and mixing a porous alumina support and a nickel-containing compound having a melting point lower than the porous alumina support, and melt-infiltrating the nickel-containing compound into pores of the surface, inside, or both of the porous alumina support in a closed system at a temperature ranging from the melting point of the nickel-containing compound to +5° C. higher than the melting point; and a second step of thermally treating the melt-infiltrated composite powder at 400 to 600° C. under reducing gas atmosphere to load nickel particles having the average particle size of 10 nm or less in the porous alumina support; or a nickel/silica-alumina hybrid catalyst comprising the first catalyst; and a yolk-shell shaped second catalyst for methane steam reforming which has a nano- or micro-sized average diameter and includes a hollow shell consisting of porous silica of which inside is accessible to methane; and a core consisting of nickel-containing particle located inside the hollow shell;

ii) a step of applying the first catalyst, or the hybrid catalyst of the first and the second catalysts to a reactor of methane steam reforming;

iii) a step of reducing to activate the first catalyst, or the hybrid catalyst of the first and the second catalysts; and iv) a step of feeding methane-containing gas and steam to the reactor of methane steam reforming and carrying out the methane steam reforming by using the activated catalyst for methane steam reforming under the molar ratio of steam/methane ($H_2O/CH_4$) of 2 to 4 and the gas hourly space velocity (GHSV) of 50 to 300 $NL \cdot g_{cat}^{-1} \cdot h^{-1}$.

A second aspect of the present invention provides a method of preparing hydrogen from methane-containing gas with a methane conversion of 50% or more, which comprises i) a step of providing a first catalyst for methane steam reforming which is prepared by a first step of grinding and mixing a porous alumina support and a nickel-containing compound having a melting point lower than the porous alumina support, and melt-infiltrating the nickel containing compound into pores of the surface, inside, or both of the porous alumina support in a closed system at a temperature ranging from the melting point of the nickel-containing compound to +5° C. higher than the melting point; and a second step of thermally treating the melt-infiltrated composite powder at 400 to 600° C. under reducing gas atmosphere to load nickel particles having the average particle size of 10 nm or less in the porous alumina support; or a nickel/alumina-silica hybrid catalyst comprising the first catalyst; and a yolk-shell shaped second catalyst for methane steam reforming which has a nano- or micro-sized average diameter and includes a hollow shell consisting of porous silica of which inside is accessible to methane; and a core consisting of nickel-containing particle located inside the hollow shell;

ii) a step of applying the first catalyst, or the hybrid catalyst of the first and the second catalysts to a reactor of methane steam reforming;

a step of reducing to activate the first catalyst, or the hybrid catalyst of the first and the second catalysts; and iv) a step of feeding methane-containing gas and steam to the reactor of methane steam reforming and carrying out the methane steam reforming by using the activated catalyst for methane steam reforming under the molar ratio of steam/methane ($H_2O/CH_4$) of 2 to 4 and the gas hourly space velocity (GHSV) of 50 to 300 $NL \cdot g_{cat}^{-1} \cdot h^{-1}$ to form hydrogen.

A third aspect of the present invention provides a method of preparing synthetic gas from natural gas via a methane steam reforming with a methane conversion of 50% or more, which comprises i) a step of providing a first catalyst for methane steam reforming which is prepared by a first step of grinding and mixing a porous alumina support and a nickel-containing compound having a melting point lower than the porous alumina support, and melt-infiltrating the nickel-containing compound into pores of the surface, inside, or both of the porous alumina support in a closed system at a temperature ranging from the melting point of the nickel-containing compound to +5° C. higher than the melting point; and a second step of thermally treating the melt-infiltrated composite powder at 400 to 600° C.; under reducing gas atmosphere to load nickel particles having the average particle size of 10 nm or less in the porous alumina support; or a nickel/alumina-silica hybrid catalyst comprising the first catalyst; and a yolk-shell shaped second catalyst for methane steam reforming which has a nano- or micro-sized average diameter and includes a hollow shell consisting of porous silica of which inside is accessible to methane; and a core consisting of nickel-containing particle located inside the hollow shell;

ii) as step of applying the first catalyst, or the hybrid catalyst of the first and the second catalysts to a reactor of methane steam reforming;

iii) as step of reducing to activate the first catalyst, or the hybrid catalyst of the first and the second catalysts; and iv) a step of feeding the natural gas and steam to the reactor of methane steam reforming and carrying out the methane steam reforming by using the activated catalyst for methane steam reforming under the molar ratio of steam/methane ($H_2O/CH_4$) of 2 to 4 and the gas hourly space velocity (GHSV) of 50 to 300 $NL \cdot g_{cat}^{-1} \cdot h^{-1}$ to form the synthetic gas.

A fourth aspect of the present invention provides a catalyst for methane steam reforming which is prepared by a method comprising a first step of grinding and mixing a porous alumina support and a nickel-containing compound having a melting point lower than the porous alumina support, and melt-infiltrating the nickel-containing compound into pores of the surface, inside, or both of the porous alumina support in a closed system at a temperature ranging from the melting point of the nickel-containing compound to +5° C. higher than the melting point; and a second step of thermally treating the melt-infiltrated composite powder at 400 to 600° C. under reducing gas atmosphere to load nickel particles having the average particle size of 10 nm or less in the porous alumina support.

A fifth aspect of the present invention provides a nickel/silica-alumina hybrid catalyst for methane steam reforming, comprising a first catalyst for methane steam reforming which is prepared by a first step of grinding and mixing a porous alumina support and a nickel-containing compound having a melting point lower than the porous alumina support, and melt-infiltrating the nickel-containing compound into pores of the surface, inside, or both of the porous alumina support in a closed system at a temperature ranging from the melting point of the nickel-containing compound to +5° C. higher than the melting point; and a second step of thermally treating the melt-infiltrated composite powder at 400 to 600° C. under reducing gas atmosphere to load nickel particles having the average particle size of 10 nm or less in the porous alumina support; and a yolk-shell shaped second catalyst for methane steam reforming which has a nano- or micro-sized average diameter and includes a hollow shell consisting of porous silica of which inside is accessible to methane; and a core consisting of nickel-containing particle located inside the hollow shell.

BRIEF DESCRIPTION OF THE DRAWINGS

FIG. 1 is a diagram schematically depicting the process for preparing the first catalyst for steam reforming of methane by using the melt-infiltration method according to one preferable embodiment of the present invention.

FIG. 2 is a flow diagram schematically depicting the process for preparing the first catalyst for steam reforming of methane by using the melt-infiltration method according to one preferable embodiment of the present invention.

FIG. 3 is a diagram schematically depicting the process for preparing the second catalyst in the shape of nickel-silica yolk-shell hybrid structure according to one preferable embodiment of the present invention.

FIG. 4 is a flow diagram schematically depicting the process for preparing the second catalyst in the shape of nickel-silica yolk-shell hybrid structure according to one preferable embodiment of the present invention.

FIG. 5 is a diagram schematically depicting the hybrid catalyst of the first and the second catalysts for steam reforming of methane according to the present invention.

FIG. 6 is low-magnification (a, magnification: 49,000×) and high-magnification (b, magnification: 490,000×) TEM images of the Ni (15 wt %)/alumina nanocomposite catalyst reduced under hydrogen atmosphere at a high temperature.

FIG. 7 is a XRD spectrum of the Ni (15 wt %)/alumina nanocomposite catalyst reduced under hydrogen atmosphere at a high temperature.

FIG. 8 is low-magnification (magnification: 49,000×) TEM images of the Ni (15 wt %)/alumina nanocomposite catalyst reduced under hydrogen atmosphere at a high temperature with varying the temperature, wherein a, b and c represent the catalysts reduced at 300° C., 400° C. and 800° C., respectively.

FIG. 9 is XRD spectra of the Ni (15 wt %)/alumina nanocomposite catalyst reduced under hydrogen atmosphere at a high temperature with varying the temperature.

FIG. 10 is XRD spectra of the Ni/alumina nanocomposite catalyst reduced under the calcination temperature of 500° C. with varying the loading amount of nickel, wherein a, b and c represent the loading amounts of Ni: 5 wt %, Ni: 25 wt %, and Ni: 40 wt %, respectively.

FIG. 11 is TEM (magnification: 49,000×) analysis images of the Ni/alumina nanocomposite catalyst reduced under the calcination temperature of 50° C. with varying the loading amount of nickel, wherein a and c represent the loading amounts of Ni: 25 wt % and Ni: 40 wt %, respectively.

FIG. 12 is TEM images of the synthesized nickel particles (a), nickel/silica core-shell (b), and nickel/silica yolk-shell (c).

FIG. 13 shows the result of measuring methane conversion in the methane steam reforming using the nickel/alumina catalyst (reaction condition: GHSV=100 NL·$g_{cat}^{-1}$·$h^{-1}$, $H_2O/CH_4$=3).

FIG. 14 shows the result of measuring methane conversion in the methane steam reforming using the commercially available nickel-based catalyst (reaction condition: GHSV=100 NL·$g_{cat}^{-1}$·$h^{-1}$, $H_2O/CH_4$=3).

FIG. 15 shows the result of measuring methane conversion in the methane steam reforming using the nickel/alumina catalyst (reaction condition: GHSV=200 NL·$g_{cat}^{-1}$·$h^{-1}$, $H_2O/CH_4$=3).

FIG. 16 shows the result of measuring methane conversion in the methane steam reforming using the commercially available nickel-based catalyst (reaction condition: GHSV=200 NL·$g_{cat}^{-1}$·$h^{-1}$, $H_2)/CH_4$=3).

FIG. 17 shows the result of measuring methane conversion in the methane steam reforming using the nickel/alumina catalyst (reaction condition: GHSV=200 NL·$g_{cat}^{-1}$·$h^{-1}$, $H_2O/CH_4$=2).

FIG. 18 shows the result of measuring methane conversion in the steam reforming of methane using the hybrid catalyst according to the present invention (reaction condition: GHSV=200 NL·$g_{cat}^{-1}$·$h^{-1}$, $H_2O/CH_4$=2).

DESCRIPTION OF SPECIFIC EMBODIMENTS

Hereinafter, the present invention will be explained in detail.

The steam methane reforming (SMR) is used for preparing hydrogen from methane, of which reaction scheme is as follows:

Steam methane reforming (SMR):

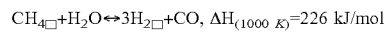

$$CH_{4\square}+H_2O \leftrightarrow 3H_{2\square}+CO, \Delta H_{(1000\ K)}=226\ kJ/mol$$

The methane steam reforming proceeds at a high temperature of 500° C. or higher, and accordingly a catalyst wherein a nickel-based metal is loaded in a thermally stable alumina support is generally used as the catalyst. However, the existing nickel-based catalysts have the problem of showing a low activity when applied to the methane steam reforming at a high gas hourly space velocity. In addition, in such a process of methane steam reforming, the prevention of catalyst inactivation due to the carbon deposition in the modified catalyst is indicated as the most important issue. In methane steam reforming, generally, the process is operated under the molar ratio of steam/methane ($H_2O/CH_4$) of 4 to 6, i.e., the molar ratio of methane steam of 1:4~6 by adding steam in an excessive amount to prevent the catalyst inactivation due to such carbon deposition. However, as the molar ratio of steam increases, much more calorie is required for the steam supply, thereby deteriorating the energy efficiency during the reaction.

In the methane steam reforming at a high temperature, the present invention provides a method of carrying out the methane steam reforming with an excellent methane conversion even under a severer condition than the typical condition of methane steam reforming, i.e., under the condition of very high gas hourly space velocity or low molar ratio of steam methane. Also, the present invention provides a catalyst wherein the active nickel particles are highly dispersed in the small level of 10 nm or less, which shows an excellent methane conversion under these severe conditions and can be prepared by a simple synthetic process using the melt infiltration. Furthermore, the present invention provides a hybrid catalyst by combining the first catalyst prepared via the melt infiltration method with the yolk-shell shaped second catalyst containing nickel in order to more enhance the efficiency of methane reforming.

For the above stated purpose, the present invention is based on the discovery that the nickel-containing compound may be uniformly loaded in the inside of the porous alumina support via the melt-infiltration process and thermally treated at the temperature condition of 400 to 600° C. under reducing gas atmosphere to prepare a catalyst wherein the nickel metal (oxidation state of 0) nanoparticles having the average particle size of 10 nm or less are uniformly distributed in a high loading amount in the porous alumina support. When this catalyst is applied to the methane steam reforming, it is thermally stable against the high temperature of 500° C. or higher and also stable against steam. Furthermore, it shows an excellent methane conversion of 50% or more under the reaction condition of a very high gas hourly space velocity, i.e., under the level of 50 to 300 $NL \cdot g_{cat}^{-1} \cdot h^{-1}$, and also it shows the high methane conversion of 50% or more even under the lower supply of steam to methane—the molar ratio of steam/methane ($H_2O/CH_4$) of 3 or less—than the conventional condition of methane steam reforming. In addition, the present inventors have found that the efficiency of methane reforming can be enhanced and the methane steam reforming can be performed more stably particularly at a high temperature when a nickel/silica-alumina hybrid catalyst comprising the catalyst prepared by the above melt infiltration method as the first catalyst and the yolk-shell shaped hybrid structure which has a nano- or micro-sized average diameter and includes a hollow shell consisting of porous silica of which inside is accessible to methane; and a core consisting of nickel-containing particle located inside the hollow shell as the second catalyst for methane steam reforming is used to carry out the process of methane steam reforming. The present invention is based on the above.

In the present invention, the first catalyst in the form that the activated nickel metal nanoparticles having the small average size of 10 nm or less are loaded in pores of the support may be prepared by selecting alumina as the support and nickel metal as the active metal, melt infiltrating the nickel-containing compound in pores of the support, and thermally treating the same under controlled conditions. As stated above, the first catalyst according to the present invention, i.e., the nickel/alumina nanocomposite catalyst may be provided as a catalyst whose nickel is highly dispersed on the porous alumina support according to the way of melt-infiltrating the nickel-containing compound into pores of the support. In addition, the first catalyst of the present invention may be obtained with a high reliability according to the simple synthetic process of external decomposition and simultaneous reduction of the nickel-containing compound loaded on the support by the thermal treatment under reducing atmosphere to give the activated nickel metal nanoparticles in the form of being loaded in the pores of porous alumina support. In particular, only the nickel-containing compound and the porous alumina support are used as the reactants for the preparation of catalyst, and a solvent is not additionally used, thereby giving the advantages of operation stability and decrease of environmental burden due to the use of solvent.

Also, in the present invention, the yolk-shell shaped nickel/silica composite catalyst may be used as the second catalyst. This second catalyst has the yolk-shell shape wherein the nickel-containing particles are located inside the hollow shell, and the reactants and products can be freely moved in the limited space of the inside of the hollow shell. It shows the advantage of providing a high catalytic activity by remarkably increasing the number of reaction between the reactants and the catalyst inside the hollow shell in which the nickel-containing particles are loaded in a large amount. In particular, when the second catalyst is used in the steam reforming of methane in the form of a hybrid catalyst with the first catalyst, it may further enhance the methane conversion, and it may exert more stable catalytic activity under a severe reaction condition of 700° C. or higher.

The present invention may prepare the first catalyst loaded with the activated nickel metal nanoparticles having the small average particle size of 10 nm or less, preferably 7 nm or less, specifically the average particle size of 3 nm to 7 nm by the melt infiltration method. This first catalyst may be applied to the steam reforming of methane to increase the surface area and the active sites of the catalyst, thereby giving the advantage of excellent efficiency of methane steam reforming, i.e., methane conversion. Also, since the present invention uses the porous alumina support as the support of the first catalyst, it is thermally stable at a high temperature as well as has an excellent mechanical strength. Furthermore, the nickel metal nanoparticles are highly dispersed with a relatively large loading amount in the pores of the support by the melt infiltration method, and thus the catalyst shows an excellent efficiency of methane steam reforming even under the relatively severe reaction conditions of a high gas hourly space velocity and small supply of steam.

Also, as stated above, the present invention may use either the first catalyst of the highly dispersed and highly active nickel/alumina alone, or the hybrid catalyst thereof with the second catalyst of the nickel/silica yolk-shell for the reaction under the more severe condition (700° C. or higher) or activity enhancement, thereby effectively producing hydrogen at a high temperature.

As aforementioned, the method of methane steam reforming; the method of preparing hydrogen; and the method of preparing synthetic gas from natural gas with the methane conversion of 50% or more according to the present invention comprise i) a step of providing a first catalyst for methane steam reforming which is prepared by a first step of grinding and mixing a porous alumina support and a nickel-containing compound having a melting point lower than the porous alumina support, and melt-infiltrating the nickel containing compound into pores of the surface, inside, or both of the porous alumina support in a closed system at a temperature ranging from the melting point of the nickel-containing compound to +5° C. higher than the melting point; and a second step of thermally treating the melt-infiltrated composite powder at 400 to 600° C. under reducing gas atmosphere to load nickel particles having the average particle size of 10 nm or less in the porous alumina support; or a nickel/silica-alumina hybrid catalyst comprising the first catalyst; and a yolk-shell shaped second catalyst for methane steam reforming which has a nano- or micro-sized average diameter and includes a hollow shell consisting of porous silica of which inside is accessible to methane; and a core consisting of nickel-containing particle located inside the hollow shell;

ii) a step of applying the first catalyst, or the hybrid catalyst of the first and the second catalysts to a reactor of methane steam reforming;

iii) a step of reducing to activate the first catalyst, or the hybrid catalyst of the first and the second catalysts; and iv) a step of feeding methane-containing gas and steam to the reactor of methane steam reforming and carrying out the methane steam reforming by using the activated catalyst for methane steam reforming under the molar ratio of steam/methane ($H_2O/CH_4$) of 2 to 4 and the gas hourly space velocity (GHSV) of 50 to 300 $NL \cdot g_{cat}^{-1} \cdot h^{-1}$.

1. Catalyst for Steam Reforming of Methane

Step i) is a step of preparing the first catalyst for steam reforming of methane, which is prepared by the melt-infiltration method to have the form that the nickel metal nanoparticles having the small average particle size of 10 nm or less are loaded in the porous alumina support; or the hybrid catalyst of the first catalyst with the yolk-shell shaped second catalyst.

As stated above, the method of preparing the first catalyst for steam reforming of methane wherein the nickel particles having the average particle size of 10 nm or less are loaded in the porous alumina support may comprise a first step of grinding and mixing a porous alumina support and a nickel-containing compound having a melting point lower than the porous alumina support, and melt-infiltrating the nickel-containing compound into pores of the surface, inside, or both of the porous alumina support in a closed system at a temperature ranging from the melting point of the nickel-containing compound to +5° C. higher than the melting point; and a second step of thermally treating the melt-infiltrated composite powder at 400 to 600° C. under reducing gas atmosphere.

The method for preparing the first catalyst for methane steam reforming according to the present invention may further comprise a third step of passivating the first catalyst after the second step.

In the present invention, the first catalyst for methane steam reforming is prepared by utilizing the melt-infiltration method which is easy to perform and finally advantageous for the high dispersion of particles, as a method of loading the nickel metal nanoparticles. Since the method of loading nanoparticles used in the present invention takes the way of grinding and mixing the porous alumina support and the metal-containing compound having a melting point lower than the porous alumina support without any solvent, dilution due to the use of solvent does not occur, which is thus advantageous for the high dispersion of nanoparticles. Accordingly, it is possible to prepare the first catalyst wherein the nano-sized nickel metal particles are uniformly supported with a high loading amount.

The first step is a step of melt-infiltrating the nickel-containing compound in the porous alumina support.

In the present invention, the nickel-containing compound having a melting point lower than the porous alumina support may be a nickel hydrate salt, but not limited thereto. Preferably, the nickel-containing compound having a melting point lower than the porous alumina support may be a nickel hydrate salt having a melting point of 30 to 150° C. The nickel hydrate salt having the above melting point is used because a part or all of the salt may be melted at room temperature to make the uniform mixing thereof with the support difficult when the melting point is less than 30° C., and the vapor pressure inside the reactor may increase to deform the plastic vessel used when the melting point exceeds 150° C. Specifically, the nickel-containing compound may be $Ni(NO_3)_2 \cdot 6H_2O$ (d=2.05 g/cm$^3$, m.p.=56.7° C.), $NiSO_4 \cdot 6H_2O$ (d=2.07 g/cm$^3$, m.p.=53° C.), $NiCl_2 \cdot 6H_2O$ (d=1.92 g/cm$^3$, m.p.=140° C. or a mixture thereof.

The nickel-containing compounds each have their specific density values. Thus, if the amount of nickel-containing compound to be infiltrated is decided considering its density and the pore volume of the porous alumina support, the nickel-containing compound may be more uniformly infiltrated.

The reactor can be selected depending on the amount of nickel-containing compound used in the melt-infiltration process and the reaction temperature. Usually, a reactor made of stainless steel may be used when the melting point of the nickel-containing compound exceeds 100° C., and a reactor made of polypropylene or teflon among the polymer plastics may be advantageously used when the melting point is 100° C. or lower.

In order to dissolve the nickel-containing compound and uniformly infiltrate the same inside the support, temperature control and pressure maintenance inside the reactor is important. Thus, the infiltration may be performed at a temperature range of the melting point of the nickel containing compound used to a temperature of 5° C. higher than the melting point, preferably at a temperature range of 2 to 5° C. higher than the melting point of the nickel-containing compound used for enabling the complete infiltration of the nickel-containing compound to be infiltrated.

Also, the reaction should be carried out in a closed system in order for the pressure generated by the vapor pressure during the infiltration process not to disappear outside. In other words, in order to block the escape of internal gas to the outside during the high-temperature reaction for melt-infiltration, it is important to tighten the lid of the reactor after the gas is introduced thereto. It is because an appropriate pressure should be formed inside the vessel during the process of melt infiltration, and the melt infiltration is well performed only when an internal pressure is formed by the inner vapor pressure at 30~150° C. If the gas escapes, the nickel-containing compound is evaporated so that the degree of penetration of the nickel-containing compound inside the support may be decreased. Thus, it is one of the important processes of the present invention to form an internal pressure by avoiding the escape of the gas.

The porous alumina support may preferably have the pore volume of 0.3 cm$^3$/g or more and the specific surface area of 100 m$^3$/g or more for the purpose of uniform loading of nickel particles which act as the catalytic active site. In order to more increase the loading amount of particles, the porous alumina support having higher pore volume and/or specific surface area may be used. For example, the porous alumina support may have the pore volume of 0.3 to 0.6 cm$^3$/g and the specific surface area of 100 to 300 m$^2$/g. The reason for limiting the pore volume and specific surface area as above is that the particles are not uniformly loaded on such a support having too small pore volume and specific surface area, and that the particles after calcining may be highly agglomerated on the surface of the support. In one example of the present invention, the gamma-alumina having the pore volume of 0.43 cm$^3$/g and the specific surface area of 185 m$^2$/g, which has the characteristics suitable as a catalyst support, is used as the porous alumina support.

In the present invention, the porous alumina support may have a form of powder, bead, pellet, or granule.

The second step is a step of thermally treating the porous alumina support, in which the nickel-containing compound in the form of a composite powder is melt infiltrated, at a certain temperature under the reducing gas atmosphere to thermally decompose the nickel-containing compound infiltrated inside the support and at the same time to reduce the same to form the activated nickel metal nanoparticles.

It is important that the thermal treatment condition proposed in the second step is controlled so that the infiltrated nickel-containing compound may be sufficiently decomposed and converted to the active metal nickel (oxidation state of 0). In particular, the temperature during the thermal treatment is preferably controlled to the range of 400 to 600° C., and most preferably to about 500° C. at which the particle size may not be too much increased and the reduction may be properly performed. The nickel particles are formed in a very small size to lower the stability when the temperature of thermal treatment is less than 400° C., and some particles may be agglomerated to make the size somewhat larger when the temperature exceeds 600° C.

The reducing gas in the second step may be hydrogen, or a mixture of hydrogen and carbon monoxide, but it is more preferable to use pure hydrogen in terms of activation of catalyst. In this case, the flow rate of the reducing gas is preferably between 10 cc/min and 500 cc/min. The reduction may not be properly performed when the gas flow rate is lower than 10 cc/min, and the gas consumption may be high and some of the catalyst may be lost due to the fast flow rate of gas when the flow rate exceeds 500 cc/min.

It is preferable that the thermal treatment in the second step is sufficiently performed for 2 hours or more, for example, 2 to 48 hours to enable the decomposition and reduction of the nickel containing compound.

The loading amount of nickel in the first catalyst for methane steam reforming according to the present invention may depend on the pore volume of the support, and may be 10 to 80% by weight, preferably 25 to 80% by weight, based on the total weight of the first catalyst. When the loading amount of nickel is less than 10% by weight, the nickel particles may not be properly formed during the nickel loading or may be formed as a too small crystal in the size of less than several nm, thereby decreasing stability against the oxidation by steam during the methane steam reforming.

The third step is a step of passivating the first catalyst for stabilizing the activated nickel catalyst.

The third step is very important in the later application to reaction of the externally reduced catalyst. It is a step of treating the surface of catalyst by using an organic solvent to prevent the contact of the catalyst with oxygen, thereby blocking the reaction between the catalyst and oxygen, i.e., oxidation reaction. The organic solvent that is able to be used may include various solvents such as ethanol, mineral oil, etc., but water cannot be used since it may oxidize the catalyst. Specifically, the passivation may be carried out by directly immersing the catalyst in an organic solvent under other inert gas atmosphere such as nitrogen or helium, not to be exposed to oxygen. For the later analysis or application to a reactor, it is preferable to use ethanol as the solvent since it is easy to dry. In the case of nickel/alumina supported catalyst stored in a solvent, since the catalyst itself has a magnetic property, it may be easily separated from the solvent by using a magnet. After separation, the catalyst may be dried again via vacuum dry and used right away, or be stored under vacuum or nitrogen gas packaging.

FIG. 1 is a diagram schematically depicting the process for preparing the catalyst for steam reforming of methane according to one preferable embodiment of the present invention. Specifically, the porous alumina support is first ground with the nickel hydrate salt, mixed together, and then aged at around the melting point of the nickel hydrate salt used above for 24 hours in an oven to give the nickel hydrate salt-alumina composite powder by melt-infiltration of the nickel hydrate salt in the porous alumina support. The melt-infiltrated composite powder thus obtained is thermally treated for 2 hours at 500° C. under hydrogen ($H_2$) gas atmosphere for the thermal decomposition and reduction of the nickel hydrate salt to finally prepare the catalyst in the form that the nickel nanoparticles are loaded in the porous alumina support.

FIG. 2 is a flow diagram schematically depicting the process for preparing the catalyst for steam reforming of methane according to one preferable embodiment of the present invention. Specifically, the nickel hydrate salt is first ground with the porous alumina support and mixed together. Then, the mixed powder of the nickel hydrate salt and the porous alumina support is introduced to a reactor, and the nickel hydrate salt is melt-infiltrated in the porous alumina support at around the melting point of the nickel hydrate salt used above. Thereafter, the melt-infiltrated nickel hydrate salt-alumina composite powder (complex) is dried at room temperature. Then, the dried powder is thermally treated under hydrogen ($H_2$) gas atmosphere for the thermal decomposition and reduction of the nickel hydrate salt to prepare the catalyst in the form that the nickel nanoparticles are loaded in the porous alumina support. Additionally, the catalyst thus reduced is cooled to room temperature and passivated to prevent additional oxidation, and the passivated catalyst is separated by using a magnet, dried under vacuum, and then may be stored until it is applied to the next process.

In the present invention, the yolk-shell shaped second catalyst for steam reforming of methane may be prepared by coating the surface of nickel salt-containing nanoparticles with a pore forming material and a silica precursor, selectively etching the nickel salt-containing nanoparticles by the treatment with an acid to form the yolk-shell shape, and then reducing the nickel salt to nickel metal with removing the pore forming material via the thermal treatment process under reducing atmosphere to form the porous hollow shell.

The terms "yolk-shell" shape as used herein means a shape that core (yolk) particles are independently fixed or separated in a flowable form inside the hollow shell. In other words, the yolk-shell shape is a shape having a void between core and shell to give the structure having a layered arrangement of core-void-shell, which corresponds to, for example, the structure of yolk-white-shell arrangement.

As shown in FIGS. 3 and 4, the second catalyst in the shape of nickel-silica yolk-shell hybrid structure may be synthesized by a process comprising a step of forming nickel particles via a polyol process (Step a); a step of coating with the pore forming material and silica by using a stober-method (Step b); a step of selectively etching the nickel particles with an acidic solution (Step c); and a step of reducing the pore forming material and particles again through the thermal treatment under reducing atmosphere (Step d).

In Step a) above, the nickel salt may be nickel (II) acetate tetrahydrate ($Ni(CH_3COO)_2.4H_2O$), nickel (II) acetylacetonate ($Ni(C_5H_7O_2)_2$) or a mixture thereof. The organic solvent that is able to be used may include alcohols such as 1,5-pentanediol, ethylene glycol, diethylene glycol, triethylene glycol, etc., and which may be used in a single system or a mixed system of two or more thereof. It is appropriate to use PVP (Polyvinylpyrrolidone) as the surfactant for effectively controlling the particle size. The reaction temperature for the organic solution wherein the nickel salt is dissolved can be 220-300° C., more preferably 250-280° C. at which the nickel salt may be sufficiently decomposed and reduced. The reaction atmosphere in which the dissolved organic salt is decomposed can be air or nitrogen atmosphere, and nitrogen atmosphere is more preferable in terms of the uniformity of particles. The reaction time is appropriately between 30 minutes to 24 hours. The nanocrystals after reaction may be separated by centrifugation after anti-solvent is added for the easy precipitation, wherein the centrifugation speed is suitably between 3000 and 10000 rpm and the time is preferably between 10 and 100 minutes. The anti-solvents usable herein include ethyl alcohol, methyl alcohol, propyl alcohol, acetone, etc. The particles separated through centrifugation may be re-dispersed in alcoholic organic solvents, and ethanol is most preferable in terms of dispersity.

In Step b) above, the pore forming material is a kind of structure inducer, and may be a neutral, anionic, or cationic surfactant. This pore forming material may be, for example, a compound having a long carbon chain of $C_{10}$-$C_{30}$. Specifically, an alkylamine- or ammoniumalkyl halide-based surfactant may be used. For example, in the above alkylamine- or ammoniumalkyl halide-based surfactant, the alkyl group may be a straight-chain or branched alkyl group having 10~30 carbon atoms. Specifically, the ammoniumalkyl halide-based surfactant may be a trialkylammonium alkyl halide, for example, a tri($C_{1-6}$ alkyl)ammonium $C_{10-30}$- alkylbromide, for example, CTAB (cetyl trimethylammonium bromide) having a long carbon chain consisting of 16 carbon atoms, but not limited thereto. Since this pore forming material has a long carbon chain, when it is mixed with a metal oxide precursor, it remains along with the precursor and then is removed during the thermal treatment to play a role of forming pores.

In Step b) above, ammonia water may be used to form a weak basic atmosphere. The silica precursors may be tetraethyl ortho silicate (TEOS, $Si(OC_2H_5)_4$), tetramethyl ortho silicate (TMOS, $Si(OCH_3)_4$), or a mixture thereof. The reaction temperature is preferably room temperature, and the reaction time is suitably 1-48 hours for achieving sufficient silica coating on the surface of particles. C18TMS (Octadecyltrimethoxysilane, $C_{21}H_{46}O_3Si$) is a suitable material for forming pores through the later thermal treatment.

In Step c) above, the acid used for etching may be hydrochloric acid, sulfuric acid, nitric acid, or a mixture thereof. It is preferable to adjust the acid treatment time to the range of 10 minutes to 1 hour in order to selectively remove particles. If the time exceeds the range, nickel may be completely dissolved to be lost.

In Step d) above, the thermal treatment process may be carried out for a sufficient time of 2 hours or more, preferably 2 to 10 hours at 500 to 700° C. in order to remove the PVP remained on the surface of catalyst and to form pores inside the silica via the removal of carbon chains in C18TEMS used as the pore forming material. Herein, it is preferable that calcining is performed under hydrogen atmosphere flowing at the level of 10-200 cc. After the thermal treatment, passivation using an organic solvent is preferably applied thereto for the prevention of catalyst oxidation and the securement of stability.

The nickel loading amount in the yolk-shell shaped second catalyst for the methane steam reforming according to the present invention may be in the level of 80 to 90% by weight, based on the total weight of the second catalyst.

As stated above, the present invention may use the first catalyst alone as a catalyst for steam reforming of methane.

Otherwise, the present invention may use the nickel/silica-alumina hybrid catalyst for methane steam reforming, which comprises the first catalyst; and the second catalyst, as a catalyst for steam reforming of methane.

As shown in FIG. 5, the hybrid catalyst of the first and the second catalysts for methane steam reforming according to the present invention represents a form of hybrid catalyst in which the first and the second catalysts are mixed together and nickel metal is loaded as an active metal.

The nickel loading amount in the hybrid catalyst of the first and the second catalysts for methane steam reforming according to the present invention may be 20 to 80% by weight, preferably 20 to 50% by weight, based on the total weight of the hybrid catalyst. The two catalysts may be ground together using a mortar during hybridization, and the hybridized powder may be pelleted using a pelletizer, mashed, strained through a sieve to make the particle size of 0.1 to 1.0 mm, and then applied to the reaction.

2. Steam Reforming of Methane

Step ii) above is a step of applying the catalyst for methane steam reforming, which is prepared in Step i) above, to the reactor of methane steam reforming.

In the present invention, the reactor of methane steam reforming may be a fixed-bed reactor or a microchannel reactor, and the fixed-bed reactor was used in one example of the present invention.

Step iii) above is a step of pretreatment for reducing the catalyst applied to the reactor of methane steam reforming for the purpose of activation thereof.

Since the catalyst used in the present invention is the nickel/alumina supported catalyst externally reduced during the preparation, it is possible to sufficiently activate the catalyst even by a relatively short reducing procedure of 30 minutes to 2 hours after application thereof to the reactor. The pretreatment for activation through the reduction may be carried out in situ inside the reactor under the same temperature condition as the methane steam reforming before the methane steam reforming is initiated. The kind and flow rate of the reducing gas are the same as those of the second step above.

Step iv) above is a step of feeding the methane-containing gas and steam and carrying out the steam reforming of methane by the activated catalyst for methane steam reforming.

In the present invention, the methane-containing gas may be natural gas.

In the present invention, the methane steam reforming of Step iv) may be carried out at the reaction temperature of 500 to 900° C. More preferably, it is better to carry out the reaction at 600 to 800° C. in order to secure the stability of catalyst and to increase the methane conversion, thereby increasing the production of hydrogen. The steam reforming of methane in Step iv) may be carried out under the reaction pressure of 1 to 10 bar, specifically under normal pressure, i.e., under the level of 1 bar.

In the present invention, when the first catalyst is used as the catalyst for methane steam reforming without the second catalyst, the steam reforming of methane in Step iv) may be carried out preferably at the reaction temperature of 500 to 750° C.

In the present invention, when the hybrid catalyst of the first and the second catalysts is used as the catalyst for methane steam reforming, the steam reforming of methane in Step iv) may be carried out preferably at the reaction temperature of 700 to 900° C.

In the present invention, it is preferable to carry out the steam reforming of methane in Step iv) under the molar ratio of steam/methane ($H_2O/CH_4$) of 2 to 4 in terms of securing the stability of catalyst or yield of product. In particular, even though the molar ratio of steam/methane ($H_2O/CH_4$) of the present invention is controlled to 3 or less, i.e., 2 to 3, which is lower than the condition of the conventional steam reforming of methane, the catalyst inactivation due to the carbon deposition therein is inhibited and the methane conversion is also excellent.

In the present invention, the methane steam reforming of Step iv) may be carried out under the gas hourly space velocity of 3 to 300 $NL \cdot g_{cat}^{-1} \cdot h^{-1}$. Even when the gas hourly space velocity is less than 3 $NL \cdot g_{cat}^{-1} \cdot h^{-1}$, the reaction may proceed but the productivity of hydrogen per unit hour is low. When the gas hourly space velocity exceeds 300 $NL \cdot g_{cat}^{-1} \cdot h^{-1}$, the methane conversion may be highly decreased. The catalytic activity is excellent in the present invention even under the high level of gas hourly space velocity of 50 to 300 $NL \cdot g_{cat}^{-1} \cdot h^{-1}$, thereby giving the excellent methane conversion.

Preferably, the methane steam reforming of Step iv) may be carried out under the reaction temperature of 500 to 900° C., reaction pressure of 1 to 10 bar, molar ratio of steam/methane ($H_2O/CH_4$) of 2 to 4, and gas hourly space velocity (GHSV) of 50 to 300 $NL \cdot g_{cat}^{-1} \cdot h^{-1}$, and the methane conversion under the above conditions may be 50% or more.

As stated above, the methane steam reforming using the nickel/alumina nanocomposite catalyst according to the present invention shows the advantages of excellent methane conversion of 50% or more and efficient production of hydrogen even under the very high gas hourly space velocity in the level of 50 $NL \cdot g_{cat}^{-1} \cdot h^{-1}$ or more, for example, 100 $NL \cdot g_{cat}^{-1} \cdot h^{-1}$ at a high temperature of 500° C. or more. Thus, the nickel/alumina nanocomposite catalyst according to the present invention can exhibit an excellent performance when applied as a catalyst in a small reactor for reforming.

Furthermore, the methane steam reforming using the nickel/silica-alumina hybrid nanocatalyst of the first and the second catalysts according to the present invention shows the advantages of excellent methane conversion of 50% or more and efficient production of hydrogen even under the very high gas hourly space velocity in the level of 50 $NL \cdot g_{cat}^{-1} \cdot h^{-1}$ or more, for example, 100 $NL \cdot g_{cat}^{-1} \cdot h^{-1}$ at a higher temperature of 700° C. or more. Thus, the nickel/silica-alumina hybrid nanocatalyst according to the present invention can exhibit an excellent performance when applied as a catalyst in a small reactor for reforming.

The present invention may prepare a catalyst wherein the activated nickel metal (oxidation state of 0) nanoparticles having the small average particle size of 10 nm or less are uniformly distributed in a high loading amount in the porous alumina support by uniformly loading the nickel containing compound in the inside of the porous alumina support via the melt-infiltration process and thermally treating the same at the temperature condition of 400 to 600° C. under reducing gas atmosphere. When this catalyst is applied to the steam reforming of methane, it is thermally stable at the high temperature of 500° C. or higher and also stable against steam. Furthermore, it shows an excellent catalytic activity with the methane conversion of 50% or more even under the very high gas space velocity and/or the low molar ratio of steam/methane ($H_2O/CH_4$). In addition, the present invention prepares a nickel/silica-alumina hybrid nanocomposite catalyst by mixing the catalyst prepared by the above melt infiltration method as the first catalyst and the nickel silica yolk-shell shaped catalyst as the second catalyst, and applies it to the steam reforming of methane to provide a still more excellent catalytic activity under the higher temperature of 700° C. or more with the excellent methane conversion.

Hereinafter, the present invention will be more specifically explained by way of the following examples. However, these examples are to illustrate the present invention, and should not be construed as limiting the scope of the present invention.

Example 1: Preparation of Nickel/Alumina Nanocomposite Catalyst

In order to achieve uniform and high amount loading of a hydrated nickel metal salt into the porous alumina support, upon initial infiltration of the carbon support with the metal salt, the ratio of the salt relative to the support alumina [S/A ratio≈Salt (the amount of nickel salt (g))/Alumina (the amount of alumina support (g)] was set to 0.87.

Specifically, 1.75 g of $Ni(NO_3)_2 \cdot 6H_2O$ (Aldrich, fw=290.79 g/mol, m.p.=56° C.) and 2.0 g of gamma-alumina (STREM, fw=101.96 g/mol) were added to a mortar and sufficiently ground using a pestle until they were made uniform. Thereafter, the hybrid powder was placed in a polypropylene vessel, after which the lid of the vessel was tightened. The vessel was placed in a drying oven whose temperature was set to 60° C., and stored therein for 24 hours. After aging for 24 hours, the hybrid powder was dried at room temperature, and then uniformly ground once more. Finally, the thermal treatment was performed in a tube-shaped calcination oven under hydrogen gas flow (atmospheric pressure, flow rate of 200 mL/min) at 500° C. for 4 hours, thus obtaining a nickel/alumina nanocomposite catalyst. When the catalyst powder thus obtained is exposed to air for a long time, it is susceptible to oxidation. Thus, immediately after activation of the catalyst, it was passivated by being wet with ethanol under the atmosphere blocked from air using nitrogen gas. Then, the catalyst was used after the process of drying the catalyst wet with ethanol in a vacuum oven. The amount of net nickel metal contained in the whole catalyst powder was calculated to be about 15 wt % assuming that the nickel salt was completely decomposed.

The TEM analysis result and the qualitative XRD (Xray Diffraction) analysis result for the catalyst as obtained above were shown in FIGS. 6 and 7, respectively. In FIG. 6, a represents a low-magnification TEM image, and b represents a high-magnification TEM image. As illustrated in FIG. 6, very small nickel particles in the level of about 5 nm were formed after completion of the hydrogen treatment at a high temperature. Also, as illustrated in FIG. 7, the phases of nickel particles were revealed to be a pure nickel metal without nickel oxide. In addition, it was possible to confirm the crystalline structure of gamma phase alumina through XRD analysis.

Example 2: Preparation of Ni (15 wt %)/Alumina Nanocomposite Catalyst Depending on Calcination Condition The melt-infiltration was carried out under the same conditions as Example 1, but finally the calcination temperature was changed during the thermal treatment under hydrogen atmosphere. As a result, as illustrated in the TEM images (FIG. 8) and XRD spectra (FIG. 9), there occurred problems that too small nickel particles were formed under the thermal treatment at 300° C. to decrease their stability, and some particles were agglomerated under the thermal treatment at a high temperature of 800° C. to make the particle size somewhat larger.

Example 3: Preparation of Ni/Alumina Nanocomposite Catalyst Depending on Loading Amount The catalysts were prepared according to the same procedure as Example 1, except that the nickel content finally loaded became 5 w %, 25 wt %, and 40 wt %, respectively. For this purpose, the amount of alumina was equally set to 2 g, and the amount of $Ni(NO_3)_2 \cdot 6H_2O$ salt was set to 0.52 g (catalyst of 5 wt % Ni), 3.30 g (catalyst of 25 wt % Ni), 6.60 g (catalyst of 40 wt % Ni), respectively. After aging for 24 hours, the hybrid powder was dried at room temperature, and then uniformly ground once more. Finally, the thermal treatment was performed in a tube-shaped calcination oven under hydrogen gas flow (atmospheric pressure, flow rate of 200 mL/min) at 500° C. for 4 hours, thus obtaining a nickel; alumina nanocomposite catalyst.

Upon comparing the XRD analysis results of the catalysts thus obtained (FIG. 10), very sharp peaks were observed when 25 wt % or more nickel was loaded, which confirmed the formation of very large nickel particles having several tens of nm or more. When 5 wt % of Ni was loaded, the nickel particles were not properly formed or too small crystals having less than several nm were formed, thereby deteriorating the stability against the oxidation by steam during the reaction.

In the analysis of TEM image (FIG. 11), like the result of XRD, it was confirmed that some particles were grown to the level of 50 nm when 25 wt % of nickel was loaded and the particles were grown to the level of around 100 nm when 40 wt % of nickel was loaded.

Example 4: Preparation of Nickel Silica Yolk-Shell Catalyst

First, 2.1 g (8 mmol) of nickel acetylacetonate along with 10.7 g (96 mmol) of PVP was added to 100 ml of 1,5-pentanediol solution. Thereafter, the reaction vessel was made to be under nitrogen atmosphere, which was slowly warmed to 200° C. for 20 minutes. After the temperature reached 200° C., the solution was maintained for 4 hours until the nickel salt was completely dissolved to give a homogeneous solution. Then, the solution was rapidly warmed to 270° C. for 10 minutes. The reactants were additionally refluxed for 1 hour at 270° C., after which they were rapidly cooled in ice water. To the reaction solution cooled to room temperature was added 100 mL of acetone, which was then centrifuged for 20 minutes at 10,000 rpm. Then, the precipitate was washed by repetitive dispersion/precipitation in ethanol using centrifugation. At this time, the nickel particles thus obtained showed the size in the level of 40~50 nm.

For the purpose of coating with silica, first, 4 mL of concentrated ammonia water (7.4 M) was added to 50 mL of nickel solution dispersed in ethanol (0.16 M). Then, TMOS (tetramethylorthosilicate) and C18 TMS (octadecyltrimethoxysilane) were additionally added thereto, which was then stirred for 1 hour. After reaction of 1 hour, the product was separated by centrifugation and washed several times with ethanol. The silica not coated on nickel was selectively separated/removed by using a magnet. Then, for selectively etching the nickel particles inside the silica, 11.5 mL of conc. hydrochloric acid (1.5 M) was added to 30 mL of a solution wherein nickel/silica core-shell particles are dispersed in ethanol (0.27 M). After the addition, the mixture was stirred for 30 minutes at room temperature, and after the reaction it was washed several times with ethanol. The nickel silica yolk-shell powder washed and dried was subjected to an annealing process for 2 hours at 500° C. under hydrogen atmosphere by raising the temperature of the tube-shaped furnace at the rate of 5.5° C./min, through which micropores were formed inside the silica shell and finally the nickel silica yolk-shell catalyst was prepared.

Here, the amount of Ni loaded in silica was determined to be high as much as about 89 wt % by ED-XRF (energy dispersive X-ray fluorescence) analysis. When the finally obtained nickel/silica yolk-shell catalyst is exposed to air, it is susceptible to rapid oxidation. Thus, after calcination, it was stored in ethanol under nitrogen atmosphere that is effective for passivation.

FIG. 12 shows TEM images of the synthesized nickel particles (a), nickel/silica core-shell (b), and nickel/silica yolk-shell (c). As illustrated in FIG. 12, it was confirmed that the nickel particles in the level of 40~50 nm were synthesized, after which the nickel/silica core-shell was obtained through the silica coating, and the nickel/silica yolk-shell structure was formed through the selective etching of the nickel core.

Example 5: Steam Reforming of Methane Using Nickel/Alumina Nanocomposite Catalyst According to the Present Invention (GHSV=100 NL·$g_{cat}^{-1}$·$h^{-1}$, $H_2O/CH_4$=3)

In order to confirm the performance of the nickel/alumina nanocomposite catalyst prepared in Example 1, it was applied to the steam reforming of methane. The reactor used for confirming the catalyst characteristics was a fixed-bed reactor, and the reaction proceeded under an automated system that is able to be operated by PC. To the reactor having the inner diameter of 6 mm was loaded 50 mg of the catalyst obtained and dried. In order to supplement the oxidation on the surface of nickel particles that may occur in some of the particles during the catalytic process, the catalyst was in-situ reduced in the reactor by the thermal treatment under hydrogen flow (100 mL/min) for 1 hour at a high temperature of 700° C. prior to the reaction. After reduction of 1 hour at 700° C., the hydrogen feeding was stopped. Then, methane streamed in the flow rate of 20.8 mL/min and at the same time water was injected in the flow rate of 0.05 g/min using a HPLC pump, after which water was changed to steam using a heater and fed into the reactor. In other words, a mixed gas consisting of methane and steam in the ratio of 1:3 was injected to the reactor in the rate of 83.3 mL/min, during which the steam reforming of methane was carried out at 700° C. The result of reaction for 3 hours is shown in FIG. 13.

As illustrated in FIG. 13, it was confirmed that the methane conversion reached the level of 80% when the steam reforming of methane was carried out using the catalyst of Example 1.

Comparative Example 1: Steam Reforming of Methane Using Commercially Available Nickel-Based Catalyst (GHSV=100 NL·$g_{cat}^{-1}$·$h^{-1}$, $H_2O/CH_4$=3)

Under the same conditions as Example 5, the reaction was carried out except that the same amount of the commercially available catalyst manufactured by Haldor Topsøe Company was used.

The commercially available nickel-based catalyst had the composition of Ni/MgAl$_2$O$_4$ and was confirmed to consist of 18% of Ni, 17% of MgO and 65% of Al$_2$O$_3$ through the elemental analysis by EDXRF. As illustrated in FIG. 14, it was confirmed that the methane conversion reached the level of 70%, which is lower than 80% by the nickel/alumina nanocomposite catalyst of Example 5, when the steam reforming of methane was carried out using the commercially available catalyst.

Example 6: Steam Reforming of Methane Using Nickel/Alumina Nanocatalyst According to the Present Invention (GHSV=200 NL·$g_{cat}^{-1}$·$h^{-1}$, $H_2O/CH_4$=3)

The reaction was carried out using the nickel/alumina nanocomposite catalyst prepared in Example 1 under the gas hourly space velocity (GHSV) increased to 200 NL·$g_{cat}^{-1}$·$h^{-1}$.

In the same manner as Example 5, the same amount of catalyst was injected to a reactor. Then, the catalyst was in-situ reduced in the reactor by the thermal treatment under hydrogen flow (100 mL/min) for 1 hour at a high temperature of 700° C. prior to the reaction. After reduction of 1 hour at 700° C. the hydrogen feeding was stopped. Then, methane streamed in the flow rate of 41.7 mL/min and at the same time water was injected in the flow rate of 0.1 g/min using a HPLC pump, after which water was changed to steam using a heater and fed into the reactor. In other words, a mixed gas consisting of methane and steam in the ratio of 1:3 was injected to the reactor in the rate of 167 mL/min, during which the steam reforming of methane was carried out at 700° C. The result of reaction for 3 hours is shown in FIG. 15.

As illustrated in FIG. 15, it was confirmed that the methane conversion reached the level of 65% even when the steam reforming of methane was carried out under the condition of high flow rate.

Comparative Example 2: Steam Reforming of Methane Using Commercially Available Nickel-Based Catalyst (GHSV=200 NL·$g_{cat}^{-1}$·$h^{-1}$, $H_2O$/$CH_4$=3)

Under the same conditions as Example 6, the reaction was carried out except that the same amount of the commercially available catalyst manufactured by Haldor Topsøe Company was used.

As illustrated in FIG. 16, it was confirmed that the methane conversion was obtained in the level of 55-60%, which is lower than 65% by the nickel/alumina nanocomposite catalyst of Example 6, when the steam reforming of methane was carried out using the commercially available catalyst.

Example 7: Steam Reforming of Methane Using Nickel/Alumina Nanocatalyst (GHSV=200 NL·$g_{cat}^{-1}$·$h^{-1}$, $H_2O$/$CH_4$=2)

The reaction was carried out using the nickel/alumina nanocomposite catalyst prepared in Example 1 under the conditions that the gas hourly space velocity (GHSV) was increased to 200 NL$g_{cat}^{-1}h^{-1}$ and the ratio of steam to methane was decreased to $H_2O$/$CH_4$=2).

In the same manner as Example 5, the same amount of catalyst was injected to a reactor. Then, the catalyst was in-situ reduced in the reactor by the thermal treatment under hydrogen flow (100 mL/min) for 1 hour at a high temperature of 700° C. prior to the reaction. After reduction of 1 hour at 700° C., the hydrogen feeding was stopped. Then, methane streamed in the flow rate of 55.6 mL/min and at the same time water was injected in the flow rate of 0.089 g/min using a HPLC pump, after which water was changed to steam using a heater and fed into the reactor. In other words, a mixed gas consisting of methane and steam in the ratio of 1:2 was injected to the reactor in the rate of 167 mL/min during which the steam reforming of methane was carried out at 700° C. The result of reaction for 3 hours is shown in FIG. 17.

As illustrated in FIG. 17, it was confirmed that the methane conversion reached the level of 55-60% even when the steam reforming of methane was carried out under the condition of low feeding ratio of steam.

Example 8: Preparation of Nickel/Silica-Alumina Hybrid Nanocomposite Catalyst Depending on the Loading Amount and Steam-Methane Reforming Using the Same (GHSV=200 NL·$g_{cat}^{-1}$·$h^{-1}$, $H_2O$/$CH_4$=3)

The nickel-highly dispersive and low-cost nickel-alumina catalyst prepared by the melt-infiltration method of Example 1 (Ni: 15 wt % loading) (the first catalyst) and the nickel/silica yolk-shell catalyst prepared in Example 4 (Ni: 89 wt % loading) (the second catalyst) were mixed together in the ratio that nickel/silica yolk-shell catalyst:nickel/alumina catalyst was 1:6.4 (g) on the basis of weight to prepare the nickel/silica-alumina hybrid catalyst on which 25 wt % of Ni was loaded.

The hybrid nanocatalyst thus prepared was applied to the steam reforming of methane for the purpose of confirming its performance. The reactor used for confirming the catalyst characteristics was a fixed-bed reactor, and the reaction proceeded under an automated system that is able to be operated by PC. To the reactor having the inner diameter of 6 mm was loaded 50 mg of the hybrid catalyst. In order to supplement the oxidation on the surface of nickel particles that may occur in some of the particles during the catalyst loading, the catalyst was in-situ reduced in the reactor by the thermal treatment under hydrogen flow (100 mL/min) for 1 hour at a high temperature of 700° C., prior to the reaction. After reduction of 1 hour at 700° C., the hydrogen feeding was stopped at 750° C. Then, methane streamed in the flow rate of 41.7 mL/min and at the same time water was injected in the flow rate of 0.1 g/min using a HPLC pump, after which water was changed to steam using a heater and fed into the reactor. In other words, a mixed gas consisting of methane and steam in the ratio of 1:3 (v/v) was injected to the reactor in the rate of 167 mL/min, during which the steam reforming of methane was carried out at 750° C. The result of reaction for 4 hours and 20 minutes is shown in FIG. 18.

As illustrated in FIG. 18, it was confirmed that the methane conversion reached the level of 70% via the stable maintenance of the catalytic activity even at the higher temperature of 750° C. when the steam reforming of methane was carried out using the hybrid catalyst according to the present invention.

What is claimed is:

1. A method of methane steam reforming with a methane conversion of 50% or more under severe reaction conditions of a high gas hourly space velocity of 100 to 300 NL·$g_{cat}^{-1}$·$h^{-1}$ and a low steam supply with a molar ratio of steam/methane ($H_2O$/$CH_4$) of 2 to 4, which comprises:

i) a step of providing a first catalyst for methane steam reforming, wherein nickel particles having an average particle size of 10 nm or less are uniformly loaded into pores distributed inside a porous gamma-alumina support, thereby preventing an inactivation of catalyst due to carbon deposition under severe reaction conditions of the high gas hourly space velocity of 100 to 300 NL·$g_{cat}^{-1}$·$h^{-1}$ and the low steam supply with the molar ratio of steam/methane ($H_2O$/$CH_4$) of 2 to 4, which is prepared by a first step of grinding and mixing the porous gamma-alumina support and a nickel-containing compound having a melting point lower than the porous gamma-alumina support, and melt-infiltrating the nickel-containing compound into pores of the surface, inside, or both of the porous gamma-alumina support in a closed system at a temperature ranging from the melting point of the nickel-containing compound to +5° C. higher than the melting point; and a second step of thermally treating the melt-infiltrated composite powder at 400 to 600° C. under reducing gas atmosphere to load nickel particles having the average particle size of 10 nm or less in the porous gamma-alumina support; or
a nickel/silica-alumina hybrid catalyst comprising:
the first catalyst; and
a yolk-shell shaped second catalyst for methane steam reforming which includes a hollow shell consisting of porous silica of which inside is accessible to methane; and a core consisting of nickel-containing panicle located inside the hollow shell;
ii) a step of applying the first catalyst with the methane conversion of 50% or more under severe reaction conditions of the high gas hourly space velocity of 200 $NL \cdot g_{cat}^{-1} \cdot h^{-1}$ and low steam supply with a molar ratio of steam/methane ($H_2O/CH_4$) of 2, or the hybrid catalyst comprising the first catalyst and the yolk-shell shaped second catalyst to a reactor of methane steam reforming;
iii) a step of reducing to activate the first catalyst, or the hybrid catalyst to form an activated catalyst; and
iv) a step of feeding methane-containing gas and steam to the reactor of methane steam reforming and carrying out the methane steam reforming by using the activated catalyst for methane steam reforming under the molar ratio of steam/methane ($H_2O/CH_4$) of 2 to 4 and the gas hourly space velocity (GHSV) of 100 to 300 $NL \cdot g_{cat}^{-1} \cdot h^{-1}$, while the carbon deposition on the nickel particles loaded into pores distributed inside the porous gamma-alumina support is prevented, thereby extending an inactivation time of the first catalyst.

2. The method of claim 1 wherein the nickel/silica-alumina hybrid catalyst is used in the methane steam reforming.

3. The method of claim 1, wherein the porous gamma-alumina support has a pore volume of 0.3 to 0.6 $cm^3/g$ and a specific surface area of 100 to 300 $m^2/g$.

4. The method of claim 1, wherein the nickel-containing compound is a nickel hydrate salt having a melting point of 30 to 150° C.

5. The method of claim 1, wherein the nickel-containing compound is $Ni(NO_3)_2 \cdot 6H_2O$, $NiSO_4 \cdot 6H_2O$, $NiCl_2 \cdot 6H_2O$, or a mixture thereof.

6. The method of claim 1, wherein the loading amount of nickel in the first catalyst; or in the hybrid catalyst of the first and the second catalysts is 10 to 80% by weight based on the weight of the whole catalyst.

7. The method of claim 1, wherein the first catalyst for methane steam reforming is prepared by a process further comprising a third step of passivating the first catalyst with an organic solvent after the second step of thermally treating the melt-infiltrated composite powder at 400 to 600° C. under reducing gas atmosphere to load nickel particles having the average particle size of 10 nm or less in the porous gamma-alumina support.

8. The method of claim 1, wherein the yolk-shell shaped second catalyst is prepared by coating the surface of nickel salt-containing nanoparticles with a pore forming material and a silica precursor, selectively etching the nickel salt-containing nanoparticles by the treatment with an acid to make the yolk-shell shape, and then reducing the nickel salt to nickel metal with removing the pore forming material via a thermal treatment process under reducing atmosphere to form the porous hollow shell.

9. The method of claim 8, wherein the nickel salt is nickel (II) acetate tetrahydrate ($Ni(CH_3COO)_2 \cdot 4H_2O$), nickel (II) acetylacetonate ($Ni(C_5H_7O_2)_2$), or a mixture thereof.

10. The method of claim 8, wherein the pore forming material is a compound having a long carbon chain of $C_{10} \sim C_{30}$.

11. The method of claim 8, wherein the silica precursor is tetraethyl ortho silicate (TEOS, $Si(OC_2H_5)_4$), tetramethyl ortho silicate (TMOS, $Si(OCH_3)_4$), or a mixture thereof.

12. The method of claim 8, wherein the acid used for etching is hydrochloric acid, sulfuric acid, nitric acid, or a mixture thereof.

13. The method of claim 8, wherein the thermal treatment process is carried out for 2 to 10 hours at 500 to 700° C.

14. The method of claim 1, wherein the methane-containing gas is natural gas.

15. The method of claim 1, wherein the methane steam reforming of Step iv) is carried out under the reaction temperature of 500 to 900° C. reaction pressure of 1 to 10 bar, the molar ratio of steam/methane ($H_2O/CH_4$) of 2 to 4, and gas hourly space velocity (GHSV) of 100 to 300 $NL \cdot g_{cat}^{-1} \cdot h^{-1}$.

16. The method of claim 15, wherein the steam reforming of methane in Step iv) is carried out at the reaction temperature of 500 to 750° C. when the first catalyst is used as the catalyst for methane steam reforming without the second catalyst.

17. The method of claim 15, wherein the steam reforming of methane in Step iv) is carried out at the reaction temperature of 700 to 900° C. when the hybrid catalyst of the first and the second catalysts is used as the catalyst for methane steam reforming.

18. A method of preparing hydrogen from methane-containing gas with a methane conversion of 50% or more under severe reaction conditions of a high gas hourly space velocity of 100 to 300 $NL \cdot g_{cat}^{-1} \cdot h^{-1}$ and a low steam supply with a molar ratio of steam/methane ($H_2O/CH_4$) of 2 to 4, which comprises:
i) a step of providing a first catalyst for methane steam reforming, wherein nickel particles having an average particle size of 10 nm or less are uniformly loaded into pores distributed inside a porous gamma-alumina support, thereby preventing an inactivation of catalyst due to carbon deposition under severe reaction conditions of the high gas hourly space velocity of 100 to 300 $NL \cdot g_{cat}^{-1} \cdot h^{-1}$ and the low steam supply with the molar ratio of steam/methane ($H_2O/CH_4$) of 2 to 4, which is prepared by a first step of grinding and mixing the porous gamma-alumina support and a nickel-containing compound having a melting point lower than the porous gamma-alumina support, and melt-infiltrating the nickel-containing compound into pores of the surface, inside, or both of the porous gamma-alumina support in a closed system at a temperature ranging from the melting point of the nickel-containing compound to +5° C. higher than the melting point; and a second step of thermally treating the melt-infiltrated composite powder at 400 to 600° C. under reducing gas atmosphere to load nickel particles having the average particle size of 10 nm or less in the porous gamma-alumina support; or
a nickel/silica-alumina hybrid catalyst comprising:
the first catalyst; and a yolk-shell shaped second catalyst for methane steam reforming which includes a hollow shell consisting of porous silica of which inside is accessible to methane; and a core consisting of nickel-containing particle located inside the hollow shell;

ii) a step of applying the first catalyst with the methane conversion of 50% or more under severe reaction conditions of the high gas hourly space velocity of 200 $NL \cdot g_{cat}^{-1} \cdot h^{-1}$ and low steam supply with a molar ratio of steam/methane ($H_2O/CH_4$) of 2, or the hybrid catalyst comprising the first catalyst and the yolk-shell shaped second catalyst to a reactor of methane steam reforming;

iii) a step of reducing to activate the first catalyst, or the hybrid catalyst to form an activated catalyst iv) a step of feeding methane-containing gas and steam to the reactor of methane steam reforming and carrying out the methane steam reforming by using the activated catalyst for methane steam reforming under the molar ratio of steam/methane ($H_2O/CH_4$) of 2 to 4 and the gas hourly space velocity (GHSV) of 100 to 300 $NL \cdot g_{cat}^{-1} \cdot h^{-1}$ to form synthetic gas, while the carbon deposition on the nickel particles loaded into pores distributed inside the porous gamma-alumina support is prevented, thereby extending an inactivation time of the first catalyst; and v) a step of isolating hydrogen from the synthetic gas.

* * * * *